(12) United States Patent
Morgan et al.

(10) Patent No.: US 7,061,512 B2
(45) Date of Patent: Jun. 13, 2006

(54) CONSTANT-WEIGHT BIT-SLICE PWM METHOD AND SYSTEM FOR SCROLLING COLOR DISPLAY SYSTEMS

(75) Inventors: Daniel J. Morgan, Denton, TX (US); Donald B. Doherty, Richardson, TX (US); William J. Sexton, The Colony, TX (US)

(73) Assignee: Texas Instruments Incorporated, Dallas, TX (US)

( * ) Notice: Subject to any disclaimer, the term of this patent is extended or adjusted under 35 U.S.C. 154(b) by 104 days.

(21) Appl. No.: 10/458,408

(22) Filed: Jun. 10, 2003

(65) Prior Publication Data

US 2003/0227465 A1    Dec. 11, 2003

Related U.S. Application Data

(60) Provisional application No. 60/387,857, filed on Jun. 11, 2002.

(51) Int. Cl.
*G09G 5/10* (2006.01)

(52) U.S. Cl. .............. 345/691; 345/692; 345/693; 345/694; 345/3.2; 345/475; 345/589; 382/274; 353/31; 362/293

(58) Field of Classification Search ................ 345/3.2, 345/475, 691–693
See application file for complete search history.

(56) References Cited

U.S. PATENT DOCUMENTS

| | | | |
|---|---|---|---|
| 5,061,049 A | 10/1991 | Hornbeck | |
| 5,192,946 A | 3/1993 | Thompson et al. | |
| 5,448,314 A | 9/1995 | Heimbuch et al. | |
| 5,592,188 A | 1/1997 | Doherty et al. | |
| 5,598,188 A | 1/1997 | Gove et al. | |
| 5,612,753 A | 3/1997 | Poradish et al. | |
| 5,760,976 A | 6/1998 | DeLaMatyr et al. | |
| 5,764,208 A | 6/1998 | Burton et al. | |
| 5,912,712 A | 6/1999 | Doherty | |
| 5,969,710 A | 10/1999 | Doherty et al. | |
| 6,014,128 A * | 1/2000 | Doherty et al. | ............. 345/589 |
| 6,115,083 A | 9/2000 | Doherty et al. | |
| 6,121,977 A * | 9/2000 | Arai et al. | ................... 345/619 |
| 6,147,790 A | 11/2000 | Meier et al. | |
| 6,201,521 B1 | 3/2001 | Doherty | |
| 6,297,788 B1 * | 10/2001 | Shigeta et al. | ................ 345/63 |
| 6,324,006 B1 | 11/2001 | Morgan | |
| 6,388,611 B1 * | 5/2002 | Dillman | ................ 342/357.06 |
| 6,453,067 B1 | 9/2002 | Morgan et al. | |
| 6,456,302 B1 * | 9/2002 | Kawahara et al. | .......... 345/693 |
| 6,567,134 B1 | 5/2003 | Morgan | |
| 6,619,802 B1 * | 9/2003 | Janssen et al. | ................ 343/31 |
| 6,829,412 B1 * | 12/2004 | Li | ............................... 385/31 |
| 6,883,937 B1 * | 4/2005 | Vastola et al. | .............. 362/293 |
| 2002/0005913 A1 | 1/2002 | Morgan et al. | |
| 2002/0005914 A1 | 1/2002 | Tew | |
| 2002/0135862 A1 | 9/2002 | Dewald | |

* cited by examiner

*Primary Examiner*—Matthew C. Bella
*Assistant Examiner*—Antonio Caschera
(74) *Attorney, Agent, or Firm*—Charles A. Brill; Wade James Brady, III; Frederick J. Telecky, Jr.

(57) ABSTRACT

A display system 100 includes a light source 110 and a color wheel 114. An optical section 112 is arranged to receive light from the light source 110 and to direct the light toward a color wheel 114. A digital micromirror device 122 is arranged to receive the light from the color wheel 114 and to direct image data toward a display. The image data includes an array of pixels arranged in rows and columns. The array of pixels is arranged as curved color bands during a first time period and rectangular color bands during a second time period. The second time period being concurrent with but of a shorter duration than the first time period.

12 Claims, 20 Drawing Sheets

FIG. 5
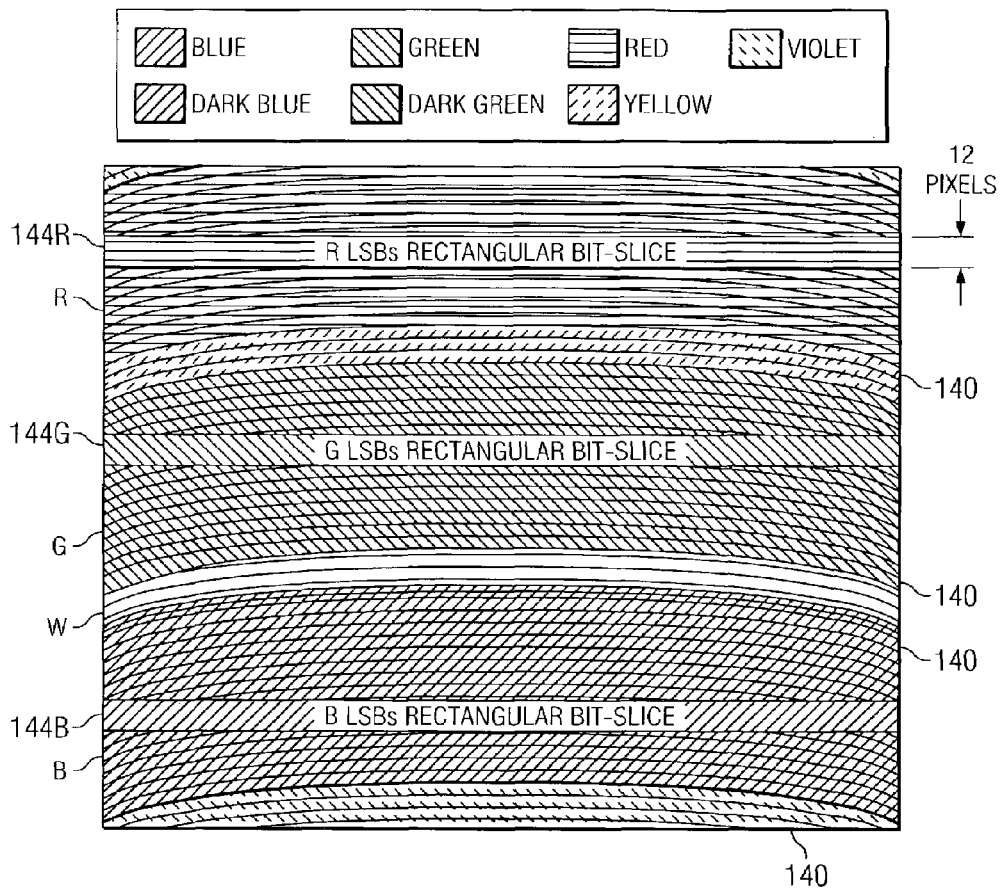
FIG. 6
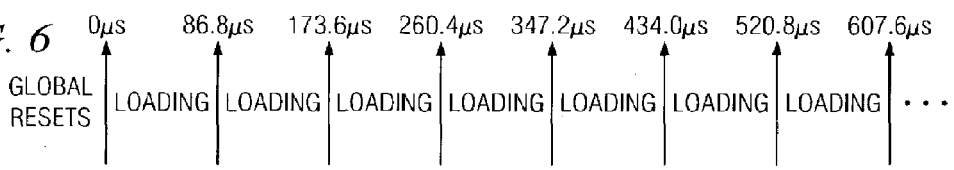
FIG. 7
- ◆ R BIT WEIGHTS: a,b,c,d,e,f,  17,17,17,...17 (FOURTEEN 17's, 101 DEG)
- ◆ G BIT WEIGHTS: a,b,c,d,e,f,  15,15,15,...15 (SIXTEEN 15's, 112 DEG)
- ◆ B BIT WEIGHTS: a,b,c,d,e,f,  18,18,18,...18 (THIRTEEN 18's, 96 DEG)
- ◆ W BIT WEIGHTS: a,b,c,  17,17,17,...17 (FIVE 17's, 51 DEG)
- ◆ SPOKE BIT WEIGHTS: 17,17,17,...17 (TWELVE 17's, 67.5 DEG)
NEED LSBs

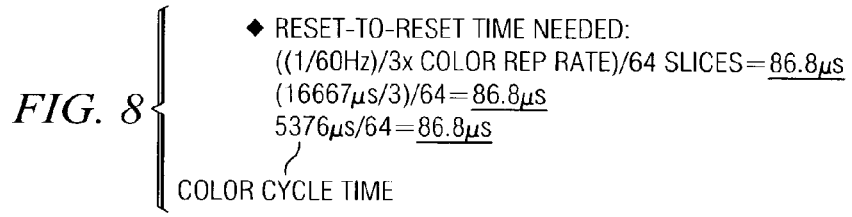
FIG. 8 {
- RESET-TO-RESET TIME NEEDED:
  ((1/60Hz)/3x COLOR REP RATE)/64 SLICES = <u>86.8μs</u>
  (16667μs/3)/64 = <u>86.8μs</u>
  5376μs/64 = <u>86.8μs</u>
  /
  COLOR CYCLE TIME
}
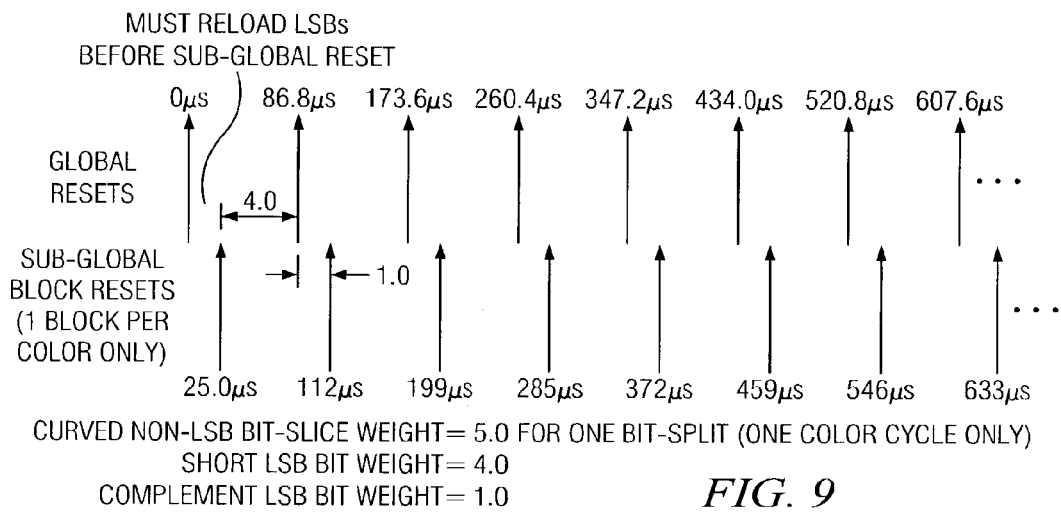
CURVED NON-LSB BIT-SLICE WEIGHT= 5.0 FOR ONE BIT-SPLIT (ONE COLOR CYCLE ONLY)
SHORT LSB BIT WEIGHT= 4.0
COMPLEMENT LSB BIT WEIGHT= 1.0
FIG. 9
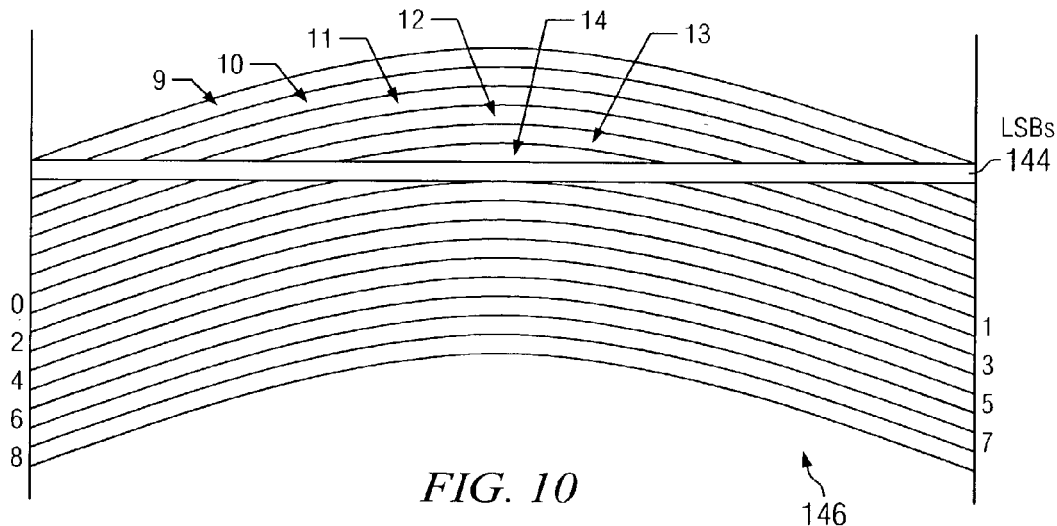
FIG. 10

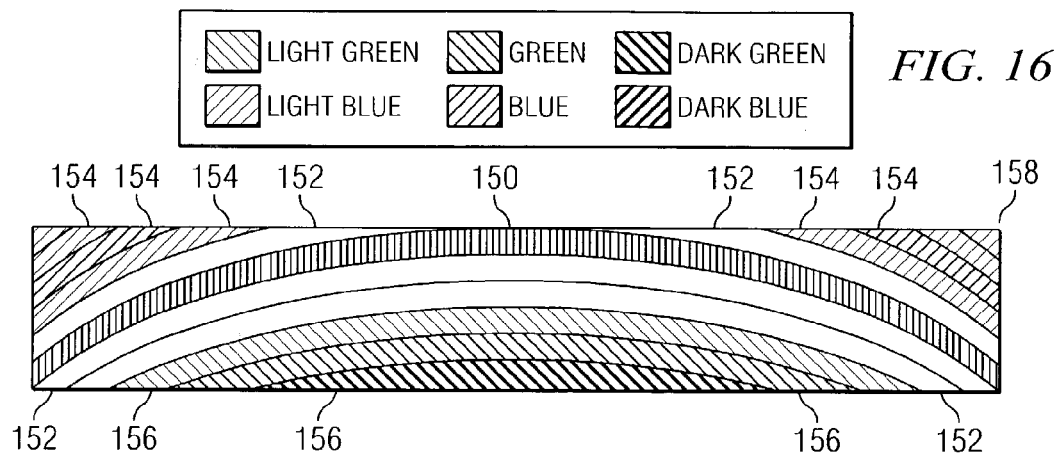
FIG. 16
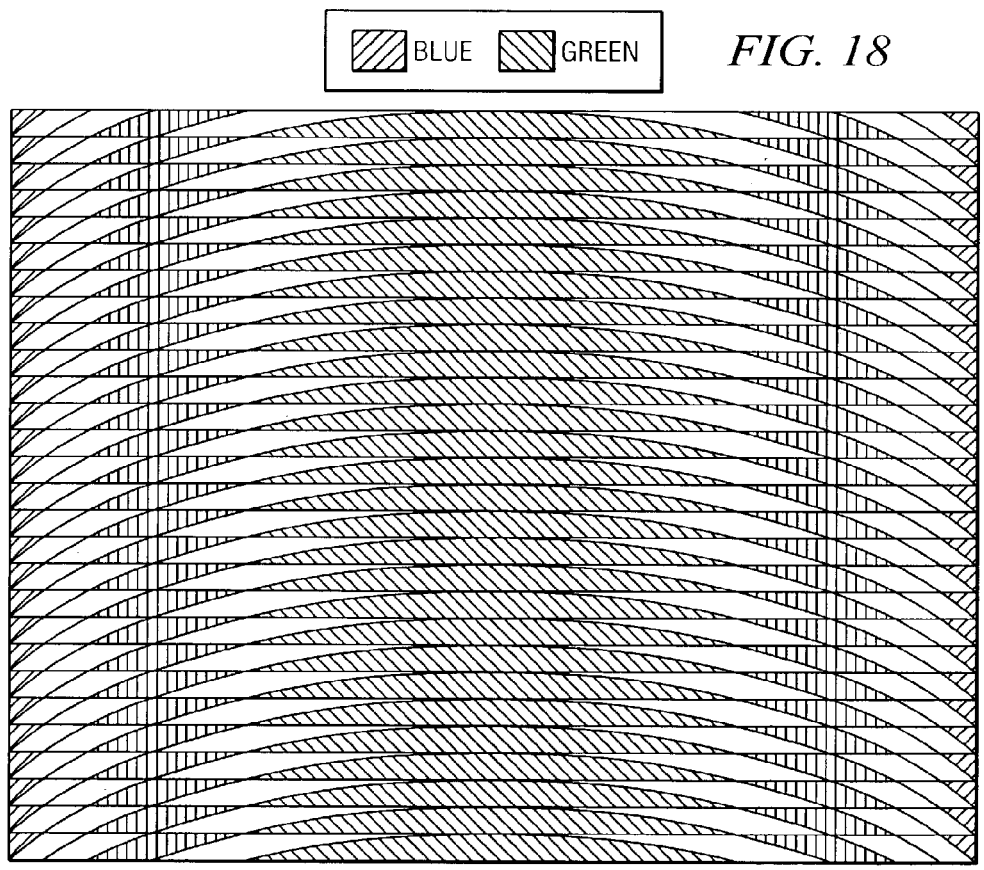
FIG. 19a & 20a
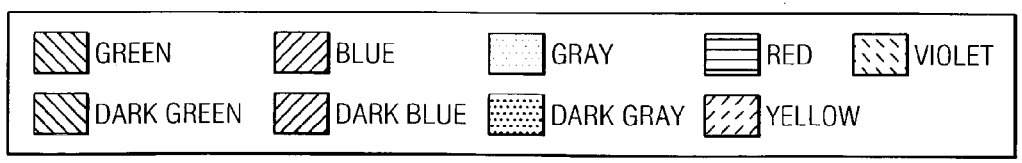

*FIG. 19b*

| | MUX1 OUT | | | | MUX2 OUT | BP | M2SEL |
|---|---|---|---|---|---|---|---|
| mux1_101 | B5 | | | → | BP101 | CLBP | Bypass |
| . | . | | : | | : | CLBP | Bypass |
| . | B0 | | | → | BP96 | CLBP | Bypass |
| . | G1 | | | → | BP95 | CLBP | Bypass |
| . | . | | : | | : | CLBP | Bypass |
| . | G0 | | | → | BP90 | CLBP | Bypass |
| . | R5 | | | → | BP89 | CLBP | Bypass |
| . | . | | : | | : | CLBP | Bypass |
| mux1_84 | R0 | | | → | BP84 | CLBP | Bypass |
| . | | | | → | BP83 | NLBP | Inc |
| . | Gap of unused MUX1 muxes | | | | . | NLBP | Inc |
| . | | | . | | . | NLBP | Inc |
| . | | | | | . | NLBP | Inc |
| mux1_65 | G16 | | | | . | NLBP | Inc |
| . | RG | | . | | . | NLBP | Inc |
| . | R | | | | . | NLBP | Inc |
| . | BR | | . | | . | NLBP | Inc |
| . | B6 | | . | | . | NLBP | Inc |
| . | . | | .. | | . | NLBP | Inc |
| mux1_32 | B11 | | | → | BP39 | NLBP | Inc |
| mux1_31 | B12 | | | → | BP38 | NLBP | Inc |
| mux1_30 | B13 | | | → | BP37 | WLBP | Inc |
| mux1_29 | B14 | | | → | BP36 | WLBP | Inc |
| mux1_28 | B15 | | | → | BP35 | WLBP | Inc |
| mux1_27 | B16 | | | → | BP34 | WLBP | Hold |
| mux1_26 | B17 | | | → | BP33 | WLBP | Hold |
| mux1_25 | B18 | | | → | BP32 | WLBP | Inc |
| mux1_24 | WB0 | | | | . | . | . |
| mux1_23 | WB1 | | . | | . | . | . |
| mux1_22 | WB2 | | . | | . | . | . |
| mux1_21 | W3 | | . | | . | . | . |
| mux1_20 | W4 | | . | | . | . | . |
| mux1_19 | W2 | | . | → | BP19 | WLBP | Hold |
| mux1_18 | W1 | | . | → | BP18 | WLBP | Hold |
| mux1_17 | W0 | | . | → | BP17 | WLBP | Inc |
| mux1_16 | W5 | | | → | BP16 | WLBP | Hold |
| mux1_15 | W6 | | | → | BP15 | WLBP | Hold |
| mux1_14 | W7 | | | → | BP14 | WLBP | Inc |
| mux1_13 | W8 | | | → | BP13 | WLBP | Hold |
| mux1_12 | GW0 | | | → | BP12 | WLBP | Hold |
| mux1_11 | GW1 | | | → | BP11 | WLBP | Inc |
| mux1_10 | GW2 | | | → | BP10 | WLBP | Hold |
| mux1_9 | G6 | | | → | BP9 | WLBP | Hold |
| mux1_8 | G7 | | | → | BP8 | WLBP | Inc |
| mux1_7 | G8 | | | → | BP7 | NLBP | Inc |
| . | . | | | | . | . | . |
| mux1_1 | G14 | | | → | BP1 | NLBP | Inc |
| mux1_0 | G15 | | | → | BP0 | NLBP | From RDRAM |
| Reference Order | MUX1 OUT | | | | MUX2 OUT | BP | M2SEL |
| | PIXEL0 | | | | PIXEL0 | TYPE | ACTION |

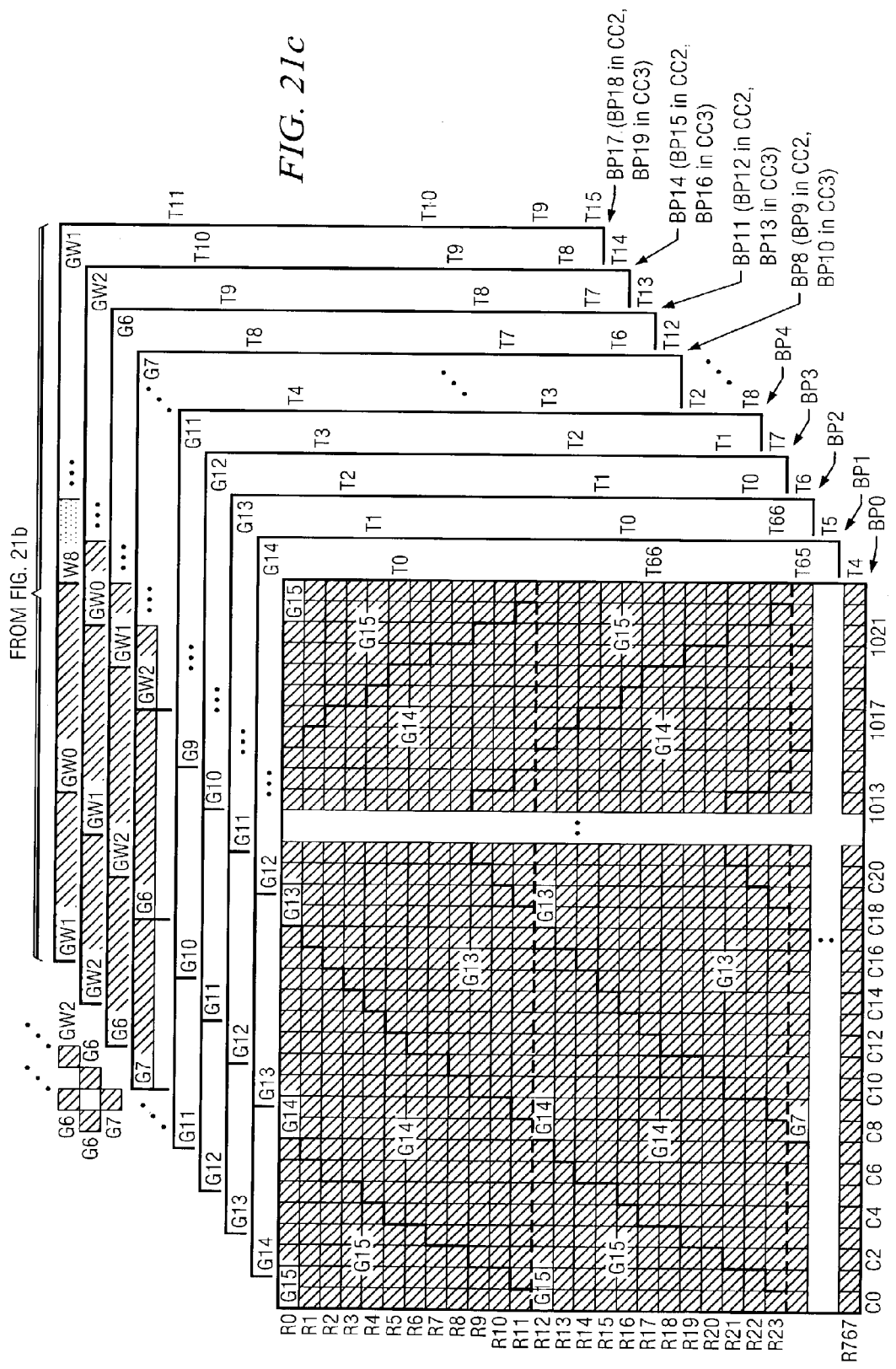

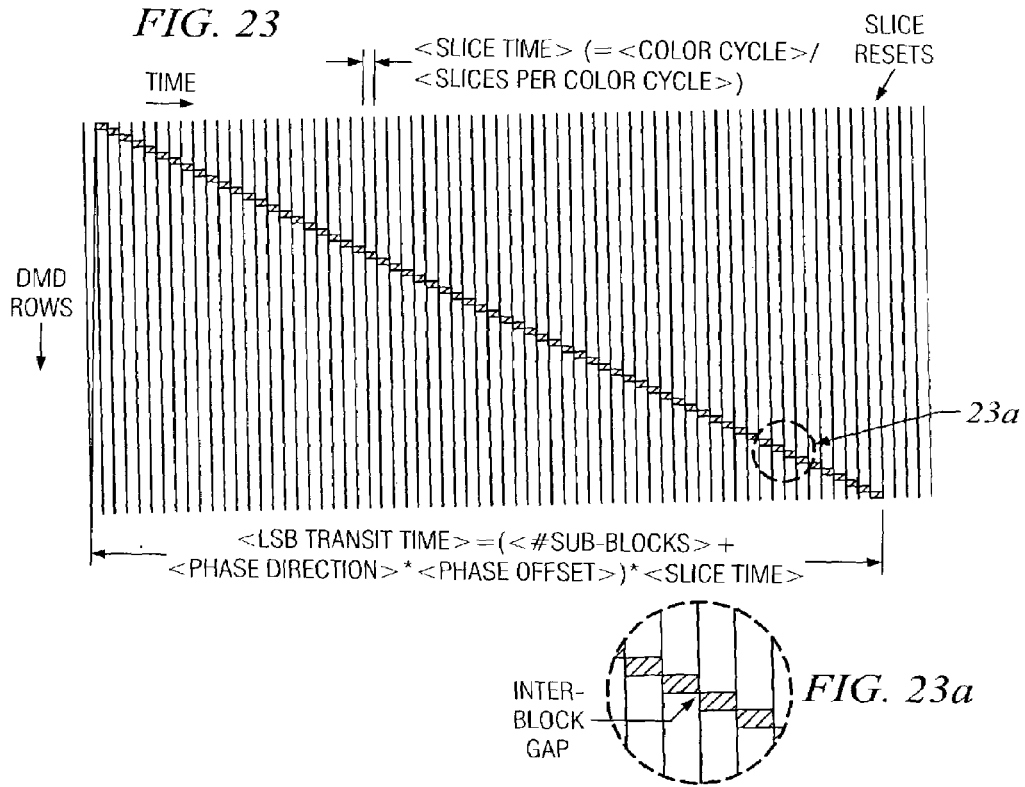
*FIG. 23*
*FIG. 23a*
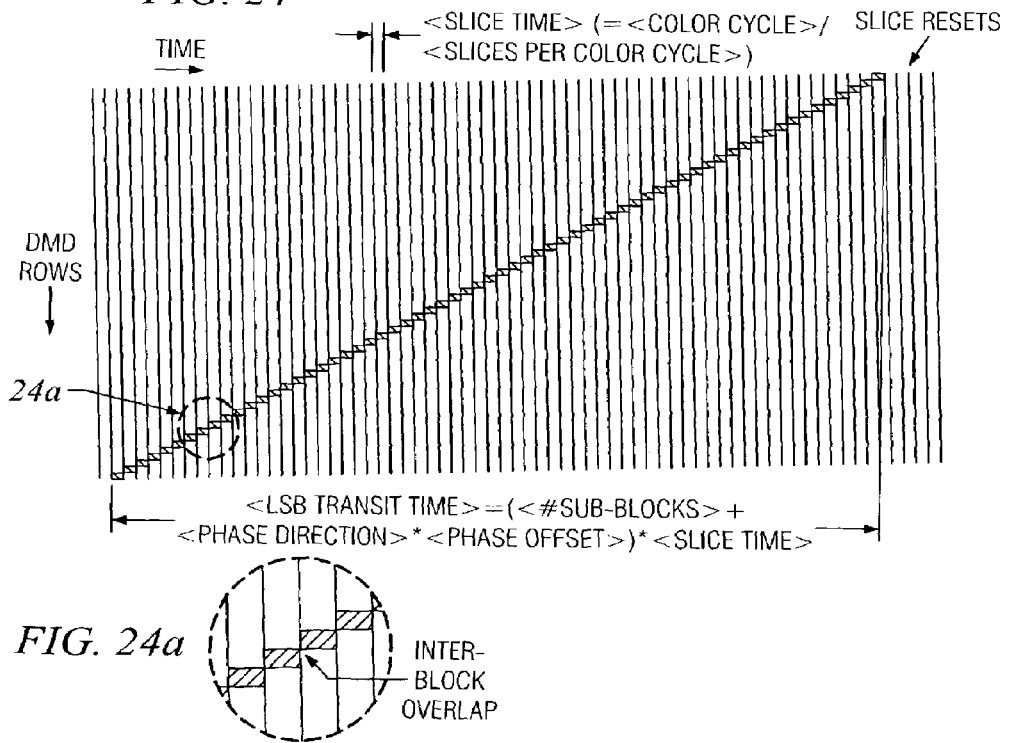
*FIG. 24*
*FIG. 24a*

CONSTANT-WEIGHT BIT-SLICE PWM METHOD AND SYSTEM FOR SCROLLING COLOR DISPLAY SYSTEMS

This application claims the benefit of U.S. Provisional Application No. 60/387,857, filed on Jun. 11, 2002, entitled "Control Electronics," which application is hereby incorporated herein by reference.

CROSS-REFERENCE TO RELATED APPLICATIONS

This application relates to the following patents and co-pending, commonly-assigned patent applications. Each of these documents is incorporated herein by reference.

| U.S. Pat. or Ser. No. | Filing Date | Issue Date |
|---|---|---|
| 09/088,674 | Jun. 2, 1998 | — |
| 6,771,325 | Nov. 3, 2000 | Aug. 3, 2004 |
| 6,642,969 | Dec. 21, 2000 | Nov. 4, 2003 |
| 09/795,402 | Feb. 26, 2001 | — |
| 6,591,022 | Dec. 21, 2001 | Jul. 8, 2003 |
| [concurrently herewith] | | |
| 10/458,045 | Jun. 10, 2003 | — |
| 5,061,049 | Sep. 13, 1990 | Oct. 29, 1991 |
| 5,192,946 | May 30, 1991 | Mar. 9, 1993 |
| 5,448,314 | Jan. 7, 1994 | Sep. 5, 1995 |
| 5,592,188 | Jan. 4, 1995 | Jan. 7, 1997 |
| 5,598,188 | Jun. 7, 1995 | Jan. 28, 1997 |
| 5,612,753 | Jan. 27, 1995 | Mar. 18, 1997 |
| 5,760,976 | Apr. 15, 1997 | Jun. 2, 1998 |
| 5,764,208 | Oct. 23, 1996 | Jun. 9, 1998 |
| 5,912,712 | May 11, 1998 | Jun. 15, 1999 |
| 5,969,710 | Aug. 30, 1996 | Oct. 19, 1999 |
| 6,115,083 | Nov. 5, 1997 | Sep. 5, 2000 |
| 6,147,790 | May 13, 1999 | Nov. 14, 2000 |
| 6,201,521 | Sep. 27, 1996 | Mar. 13, 2001 |
| 6,324,006 | May 17, 2000 | Nov. 27, 2001 |
| 6,453,067 | Oct. 20, 1998 | Sep. 17, 2002 |
| 6,567,134 | Jun. 8, 2000 | May 20, 2003 |

TECHNICAL FIELD

The present invention relates generally to color displays and the preferred embodiment relates to a constant-weight bit-slice PWM method and system for scrolling color display systems.

BACKGROUND

One technology that is used for display systems is based on a digital micromirror device or DMD. Such systems are commercially available from Texas Instruments, Inc. under the tradename DLP (Digital Light Processing). Today's DMD-based projectors typically use a single DMD with the illumination light applied in a color sequential manner (called Field-Sequential-Color or FSC). A rotating color wheel is typically used. Light is applied as red (R) then green (G) then blue (B) with each color sequentially applied so that the color completely fills the DMD.

With this system there are time intervals during each frame where the colors are briefly a mix of some pair of the RGB primary colors. This occurs when the spokes of the color wheel are passing through the lamp output light cone. This spoke light is used in today's projector via Spoke-Light-Recapture (SLR), as described in U.S. Pat. No. 6,324,006 which is incorporated herein by reference. So, for an all white screen, today's FSC projectors have the DMD on throughout the R, G, and B segment times as well as during all of the spoke times.

However, when a single color is applied to the DMD in a FSC system, the complement colors are being reflected by the color wheel and this light is scattered and lost. The color wheel is only transmissive for the color currently being applied to the DMD. For an all white screen approximately two thirds of the screen lumens are lost since during each color only ⅓ of the visible spectrum of lamp light is transmitted through the color wheel to the DMD. For example, when red light is being passed both green and blue are reflected.

One way to quantify the light loss at the color wheel is to define the term "Color Wheel Efficiency" or CWE. CWE tells how much light is lost due to the color wheel in the DMD system. CWE is the ratio of screen lumens with the color wheel installed in a projector to the screen lumens with the color wheel removed from that projector. If the color wheel were 100% transmissive you would have CWE of 100%. But for a typical FSC RGB color wheel CWE is only 33%. So for a typical FSC projector with a RGB color wheel 67% of the light is lost. This is a very significant light loss and a method is needed to recapture this lost lamp light. Scrolling Color (SC) optical concepts are devised to try and recover some of this discarded light.

Throughout this discussion the general scrolling color DMD system will be referred to as a SC projector. One SC method of recapturing the lost lamp light, which is described in co-pending application Ser. No. 09/705,467, filed Nov. 3, 2000, is called Sequential-Color-Recapture or SCR. This concept will be referred to in this disclosure as SCR, which is one type of optics for a SC projector. However, an SC projector can use other scrolling color concepts such as a rotating prism.

In today's FSC projectors a white (clear) segment is also used in addition to transmissive R, G, and B segments. This additional segment gives a lumens boost for white and grays in images since the white segment passes the full spectrum of lamp light.

For today's FSC projectors, the DMD is illuminated with mixed-color light approximately 20% of the time. This "spoke light" cannot be used to create pure R, G, or B light on the screen. With SLR, this spoke light is mixed with the W segment white light so that an effective W segment is created that is larger than the physical W segment. So for a RGBW color wheel, like with a RGB color wheel, no light is lost due to the spokes. For an all white screen with today's FSC projectors, which include a W segment, the DMD is on throughout the R, G, B, and W segment times as well as during all of the spoke times.

The addition of a W segment typically will boost screen lumens about 35% over a wheel that contains only R, G, and B segments. This 35% boost assumes a W segment size of approximately 52°, out of a 360° wheel, which is common in today's FSC projectors. This results in an increase of CWE from 33% for an RGB wheel to 44.5% for an RGBW wheel (33%×1.35). It is desirable, however, that the CWE be raised even further.

SUMMARY OF THE INVENTION

These and other problems are generally solved or circumvented, and technical advantages are generally achieved, by preferred embodiments of the present invention, which provides a constant-weight bit-slice PWM method, and system for scrolling color display systems.

In accordance with a preferred embodiment of the present invention, a method for generating data for a color display is disclosed. In this embodiment method, a plurality of digital data signals is received. The digital data signals represent different color bits of data to be displayed during a frame. The bits are arranged into a number of segments (e.g., curved segments) so that the data displayed during a first time period will be formed of a series of curved color bands. In one embodiment, a rectangular block of data bits of a color corresponding to one of the curved color bands is also determined. The rectangular block has data that is displayed during a second time period. The second time period is concurrent with but has shorter duration than the first time period.

The present invention also includes a display system. In one embodiment, this system includes a light source, a color wheel, and an optical section arranged to receive light from the light source and direct the light toward a color wheel. A digital micromirror device is arranged to receive the light from the color wheel and to direct image data toward a display. The image data includes an array of pixels arranged in rows and columns so that the array of pixels is made of curved color bands during a first time period and rectangular color bands during a second time period. The second time period is concurrent with but of a shorter duration than the first time period.

In another embodiment, a digital display system includes a digital video source. A sequencer receives control signals from the video source and a data arranger (e.g., multiplexer) receives data signals from the video source. A graphics memory receives arranged data signals from the data arranger. The arranged data signals form an array of pixels arranged in rows and columns. This array includes curved color bands during a first time period and rectangular color bands during a second time period. Once again, the second time period is concurrent with but of a shorter duration than the first time period. A digital micromirror device can receive control date from the sequencer and graphics data from the graphics memory.

BRIEF DESCRIPTION OF THE DRAWINGS

For a more complete understanding of the present invention, and the advantages thereof, reference is now made to the following descriptions taken in conjunction with the accompanying drawing, in which:

FIG. 1b shows the control electronics for a system such as the one of FIG. 1a;

FIG. 5 shows how bits are applied to a DMD during scrolling;

FIG. 6 shows the timing for the global reset timing of a DMD;

FIG. 7 shows the bit weights for one exemplary system;

FIG. 8 shows the basic stepping time calculation for each bit-slice;

FIG. 9 shows how the LSB reload and sub-global reset timing works to create two LSBs per color;

FIG. 10 shows the relationship between the curved bit slices and the rectangular LSB slices;

FIG. 16 shows an example of the W LSB region on the DMD;

FIGS. 17 and 18 show examples of sub-blocks (and bit-planes) from the region of FIG. 16;

FIGS. 19a and 19b (collectively FIG. 19) show an example of how the SuperMux input bits map to the Super-Mux output signals;

FIGS. 20a and 20b (collectively FIG. 20) show another example of how the SuperMux input bits map to the Super-Mux output signals;

FIGS. 21a, 21b and 21c (collectively FIG. 21) show how the full set of bit-planes created by the SuperMux are organized;

FIGS. 23 (and 23a) and 24 (and 24a) provide examples of phased reset timing. In FIG. 23, the scroll direction is the same as the reset phase, while in FIG. 24, the scroll direction is opposite that of the reset phase;

DETAILED DESCRIPTION OF ILLUSTRATIVE EMBODIMENTS

Figure 1A:
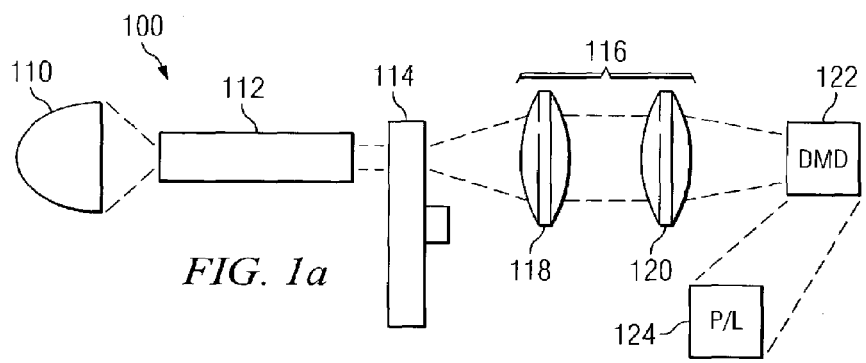
FIG. 1a is a block diagram of a basic system of the present invention.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a DMD-based display system. The invention may also be applied, however, to other color display systems. For example, systems that utilize other spatial light modulators, such as liquid crystal displays or plasma displays, can also utilize concepts of this invention.

As discussed in the background, one goal of display design, especially designed based on color-wheels, is to recapture the maximum amount of light possible. SCR (sequential color recapture) is an example of a SC (scrolling color) method to do this. A basic display system 100, which can utilize SCR, is shown in FIG. 1a.

System 100 includes a light source 110, such as an arc lamp. The light source preferably generates a full spectrum of visible light. This light is transmitted to an integrator rod 112, which provides the light to color wheel 114. Light of the desired color is then provided to optics portion 116. In this illustration, the optics portion is shown to include a first lens 118 and a second lens 120. Other optics could alternatively be used.

The light is then transmitted to DMD device 122. Examples of DMD devices can be found in U.S. Pat. Nos. 5,061,049 and 6,147,790, each of which is incorporated herein by reference. The light from the DMD is provided to projection lens 124, where it can be focused for visual display.

Figure 1B:
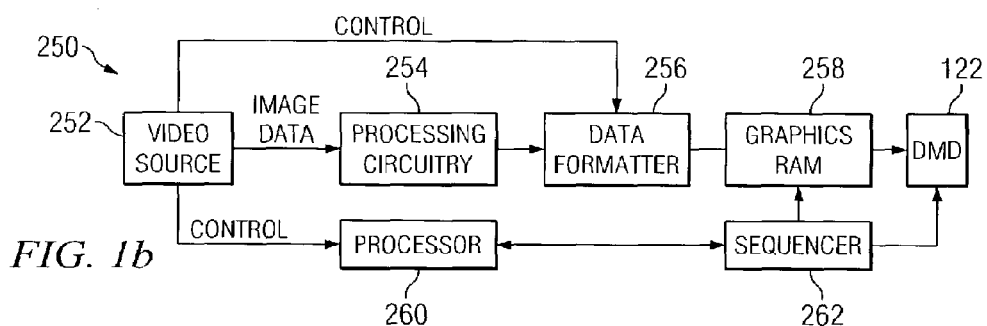

FIG. 1b shows a block diagram of electronics that drive the system 100 of FIG. 1a. Further details of a particular embodiment are described below with respect to FIG. 25.

Referring now to FIG. 1b, the system 250 includes a video source 252. In the preferred embodiment, this source provides digital RGB video or graphics. This information could have been received from any of a number of places including a computer, a set-top box for cable or satellite television, a television antenna or many other sources. The signals provided to video source can be either analog or digital. If an analog signal is received, the digital video source 252 would likely include an analog to digital converter.

Video source 252 provides image data to processing circuitry 254. The processing circuitry 254 will process the data to put it in the proper format and/or to otherwise modify characteristics of the image to be displayed. Specific examples of processing circuitry are described with respect to FIG. 25. If the video source 252 provides analog image data than the processing circuitry 254 would also include an analog-to-digital converter.

Figure 25:
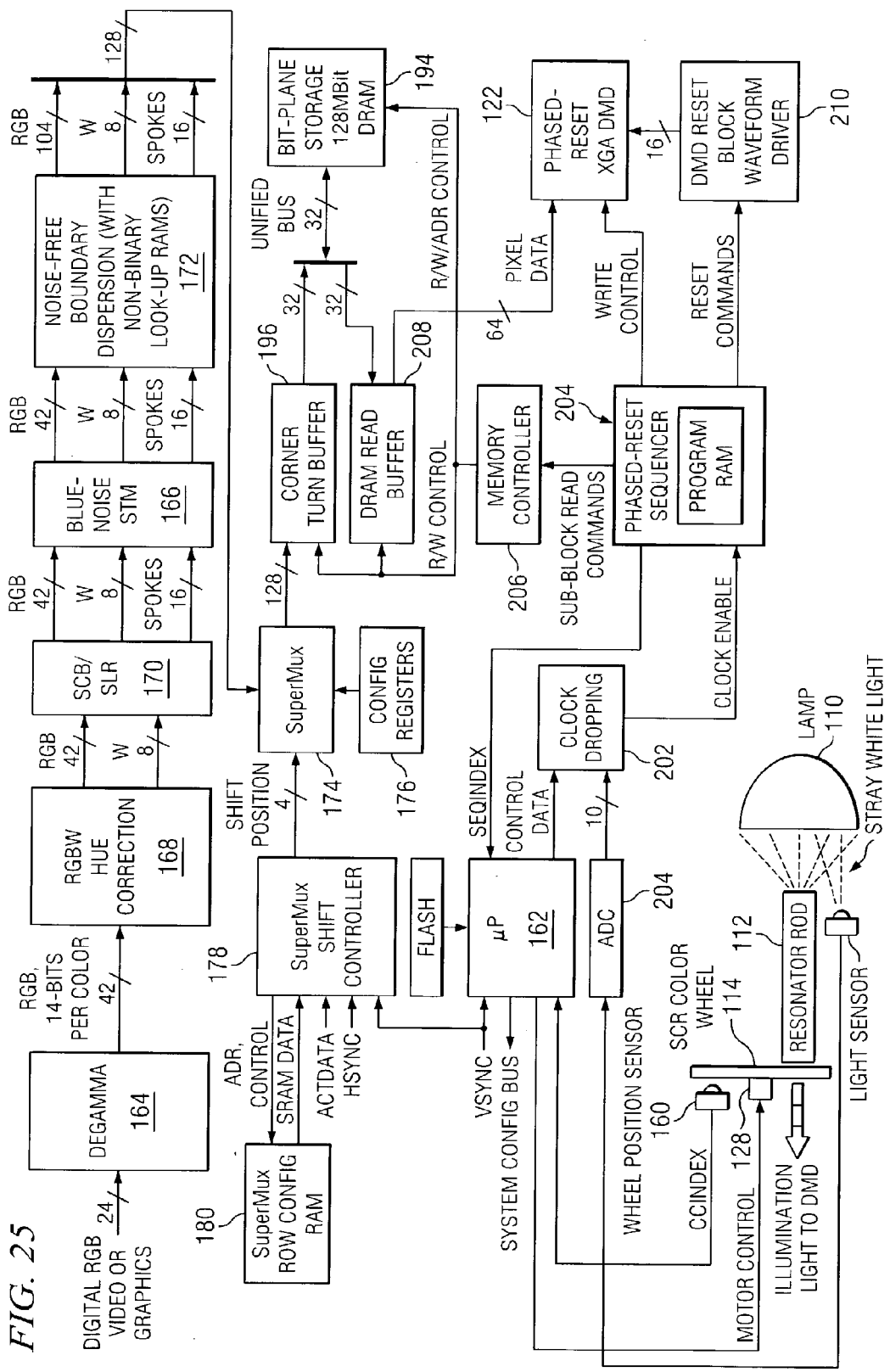
FIG. 25 shows a block diagram of control circuitry that supports the SCR optical of the preferred embodiment of the present invention.

The image data from the processing circuitry 254 is provided to a data formatter 256, which includes a Super-Mux and a Corner Turn as described in more detail with respect to FIG. 25. The SuperMux arranges the pixel data in the proper patterns to be displayed by the DMD 122. As described herein, multiple colors are displayed at any given time by the DMD. Various functions of the SuperMux within data formatter 256 (and consequently referred to as Super-Mux 256) are described below.

Graphics RAM 258 receives the image data from the SuperMux 256 and provides this data to the DMD 122. The graphics RAM is preferably a dynamic random access memory array. For example, graphics RAM 258 can be a double data rate synchronous random access memory.

Video source 252 also provides control signals to Super-Mux 256 and processor 260. Processor 260 may be a microprocessor or other processing circuit that manipulates the timing and other control signals. Processor 260 is coupled to sequencer 262, which controls the toggling of the DMD mirrors. In the preferred embodiment, sequencer 262 is a specialized processor that executes code to control the on-times of the various mirrors to generate the bit weights, as will be described in greater detail below. The sequencer 262 also comprehends the three colors.

The system 250 has been illustrated to include seven functional blocks. It is understood, however, that the delineation of particular functions is somewhat arbitrary and that each of these functions could be performed in one or more different integrated circuits. The functional blocks are labeled here for purposes of illustration and several of the functions can be combined or separated in various circuits or other functional units.

Numerous details and variations of the system are provided in the patents and patent applications incorporated by reference on the first page. Each of these details will not be repeated herein although it is understood that they can be utilized with concepts of the present invention.

A summary of patented (or patent pending) methods that have been developed by the assignee of the present invention to increase CWE in FSC projectors is listed below. The subject matter of each of these patents and patent applications is incorporated herein by reference.

Phased Reset PWM timing (U.S. Pat. Nos. 6,201,521 and 5,764,208)—increases PWM efficiency by maximizing use of available DMD data bandwidth Using a White Segment (U.S. Pat. No. 6,453,067)—uses a white segment to boost screen lumens for grays and white areas within images Spoke-Light-Recapture (U.S. Pat. No. 6,324,006)—uses spoke light to boost screen lumens for grays and white areas within images Secondary Color Boost (U.S. Pat. No. 6,567,134)—uses spoke light to boost screen secondary color lumens In addition to above items, the color wheel can be designed to increase screen lumens with the following methods:

Asymmetrical segment sizes allow a proportionally larger green segment. Green has the most lumens so the screen brightness is increased.

Overlapping dichroic color filters to share parts of the lamp light spectrum between different color dichroic filter segments (for RG and GB filter intersections).

Using very steep dichroic filter slopes to reject out-of-band light allows even more filter overlapping, to boost lumens, without degrading colors.

Using all of the above methods will boost the CWE from 33%, for an FSC RBG wheel, to approximately 48%. However even with 48% CWE, 52% of the light hitting the color wheel is lost. A new optical method that recaptures part of this lost light would be desirable.

An SCR system typically uses a color wheel with a Spiral of Archimedes pattern that is lithographically printed on to a monolithic color wheel 114. An optical resonator rod 112 is used to recapture the light that is reflected back from the color wheel 112. A white segment can also be used in an SCR wheel 114. In one aspect, the present invention provides PWM electronics to support the white segment. In fact, all of the above items listed to boost lumens with an FSC wheel can also be used to boost lumens with an SCR wheel provided that a PWM method is developed to properly support them. With SCR, when including all of the above items, SCR can typically boost CWE from 48% to 72%.

Figure 2:
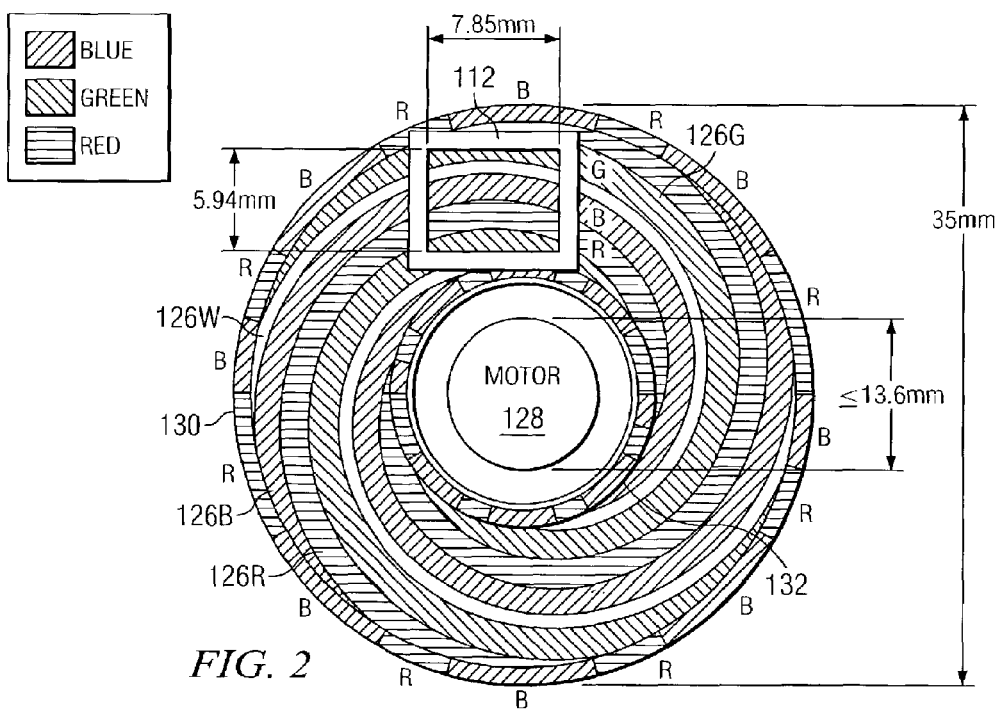
FIG. 2 is a color wheel with a Spiral of Archimedes pattern.

FIG. 2 illustrates an example of a color wheel 114 with a Spiral of Archimedes pattern. The wheel includes a number of patterns 126 that transmit the light of the associated color (e.g., portion 126R transmits red light, portion 126B transmits blue light, portion 126G transmits green light, and portion 126W transmits white light). The wheel 114 is driven by a motor 128 and controlled by a timing mark ring 130 and an optional inner timing mark ring 132. Dimensions for one exemplary color wheel 114 are also provided on the figure. These dimensions are provided as examples only and other dimensions can be used that are suitable for any particular design.

Superimposed on the color wheel 114 is the outline of an integrator rod 112. The rod 112 typically comprises a hollow rod. The outer walls of this rod are illustrated. The portion of the color wheel that receives light from the rod is illustrated within the box. As the wheel 114 rotates clockwise, each of the color bands 126 will appear to be scrolling down the box. (If the wheel rotates counter-clockwise, the color bands 126 will appear to be scrolling up the box.) As described in the co-pending SCR patent application, this technique allows more than one color to be presented to the screen during a single time period.

Figure 3:
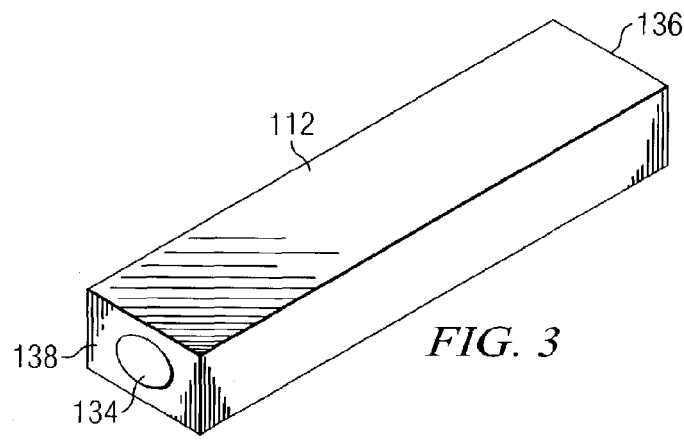
FIG. 3 is a resonator or integrator rod.

FIG. 3 shows a perspective view of the resonator or SCR integrator 112. The rod integrator includes one end 138 that is mirrored. The mirrored end 138 has a transmissive circular area 134. In the preferred embodiment, this area 134 takes about one third of the cross-sectional area of end 138. Light from light source 110 is focused into the transmissive area 134. A portion of the light that reflects back from opposite end 136 will miss the transmissive area 134 and be reflected back toward the color wheel. The outline of end 136 is what is shown in FIG. 2.

White Peaking provides a measure of how much the brightness can be increased due to the white segment and spokes for a projector based on a RGBW color wheel, over what it would be if all DMD pixels were turned off during the white segment and spokes (e.g., SLR disabled). White Peaking is given by the equation:

White Peaking=$R+G+B+W$+Spokes (in lumens)/$R+G+B$(in lumens).

Both the white segment and spokes contribute to increasing white peaking. If a projector design has a specific white peaking target value, and the spokes are very large, then the white segment must be reduced in size to allow the white peaking goal to be met. But any time that the white segment size is reduced then screen lumens are reduced since the CWE is reduced.

In an SCR projector the color band boundaries are arcs. (For other SC projectors, such as a rotating prism, color band boundaries may be straight lines.) Aspects of the present invention provide an electronics SC PWM method to optimally handle the scrolling color bands on the DMD (or other technology). Various aspects attempt to solve several of the problems that arise in this technology. These problems will now be discussed briefly.

First, big spokes reduce the white segment size and the screen lumens. Curved boundaries (arcs) at color bands, or any boundaries at color bands that are not horizontal straight lines, create very large spokes if the spoke bits are applied to the DMD in a rectangular manner. Thus, a PWM method is needed to reduce the spoke sizes so that a large white segment can be inserted for maximizing screen lumens.

If spoke sizes are very large then the White Peaking due to the spokes alone is very high and no white segment can be inserted in the SCR wheel. Large spokes also reduce the brightness of R, G, and B since less time is available in each frame for displaying these colors. Ideally spoke sizes would be in the same range as today's production FSC systems, which are approximately 18° per, spoke out of a 360° wheel. This would then allow a W segment to be inserted into the SCR wheel that is the same size used in today's FSC color wheels (typically 52°).

In addition, a large and expensive color wheel is needed to minimize spoke sizes. If the spokes are large enough, the white segment can be eliminated or reduced in size. Assuming that rectangular bits are used on the DMD, then to minimize the size of the curved boundaries very large color wheels are required. For example, a 110 mm wheel may be needed to create spoke sizes of 18° if bits displayed on the DMD are rectangular.

A large wheel, however, creates a number of problems. A 110 mm lithographically printed wheel is very expensive. A size of about 33 mm diameter is comparable in cost to the discrete-segmented wheels used in today's FSC projectors. In addition, a 110 mm wheel greatly increases the size of a projector that houses it. Today's newest FSC projectors typically weigh two to three pounds and use 70–120 cubic inches of volume. They are also 1.8"–2" thick. So a 110 mm wheel would be very difficult to fit into this projector especially since the wheel diameter typically is a driver in the overall projector thickness.

Ideally, the color wheel diameter would be in the same range or smaller than today's FSC color wheels, which are typically 45 mm diameter. For small SCR color wheels, such as 33 mm diameter, when rectangular bits are used the spokes are so large that the projector brightness is greatly degraded for R, G, and B since nearly all of the light generated is spoke light of mixed colors, and white peaking will be unacceptably high to a typical viewer. Provisional application Ser. No. 60/387,857 (from which this patent claims priority) shows example spoke sizes for a 35 mm wheel when using rectangular spoke bits. The provisional application (see Slide 5) provides a comparison to the spoke sizes achieved by the present invention (as will be described later).

Further, the spoke size can be affected by the DMD reset architecture. If the DMD is electronically structured into reset blocks such that the DMD must have an entire reset block scroll interval dedicated to the spoke time, this also increases the spoke size. This reset block introduces an overhead penalty regarding spoke size. Ideally, the spoke size would only be grown due to the time for travel of the wheel during a full DMD load time interval—not due the reset block size of the DMD or for any other DMD electronics architecture reasons. In one case, 22.5° of the spoke is due to a DMD architecture and loading method where one reset block of color scroll must be allocated to the spoke time.

Another issue is that the AC lamp light transient causes artifacts. With an SC projector many different bits must be simultaneously displayed since all color bands and spokes are always being displayed on the DMD. Any light transient due to the AC lamp current commutation can cause artifacts since the transient will corrupt the bit weights being displayed when the transient occurs. Thus the spatial outline of these bits, when the transient occurs, is very susceptible to showing spatial contouring artifacts. This artifact will look like a fixed spatial imprint of the bit areas when the transient occurred. Aspects of the present invention provide a method to allow this light transient to occur without creating objectionable screen artifacts.

Finally, artifacts can be caused by skew stepping. For any SC PWM method, bits must step down the DMD within the scrolling color bands. However, if this stepping of bits is too slow then an artifact called the "Skew Stepping Artifact" will be seen at the bit stepping boundaries. This artifact is a type of PWM Temporal Contouring since it is seen when the viewer moves his eyes. Because of this artifact, any SC PWM method needs a faster load time than an FSC system for any given DMD pixel resolution. The DMD load time directly affects the speed that the bits can be stepped. But a faster load time for the DMD also increases the number of board RAMs needed and/or the speed of these RAMs. Aspects of the present invention provide a method that improves load time while minimizing the need for more and/or faster RAMs. A new Phased Reset method is defined below that improves load time as a part of this invention.

The preferred embodiment of this invention provides a PWM method for handling curved boundaries between color bands with no penalty in spoke size even for very small low-cost color wheels (as small as 25 mm diameter typically). This preferred PWM method eliminates the reset group overhead penalty in the spoke size. Aspects of this invention also allow for a white segment to be used of the same size as today's FSC projectors. Further aspects of this invention incorporate a way to eliminate artifacts due to the AC lamp light transients. In addition, a new Phased Reset method improves load time for the preferred PWM method in this invention. Thus, various aspects of this invention provide solutions to solve each of the problems stated above.

Embodiments of this invention draw on existing core Texas Instruments intellectual property. These inventions can all modified so that they are compatible with the Constant-Weight Bit-Slice PWM Method. Examples of utilized enabling TI patented inventions (or patent pending) are:

Non-binary bit-weights (U.S. Pat. No. 5,969,710)
Phased DMD loading and Reset techniques (U.S. Pat. Nos. 6,201,521 and 5,764,208)
PWM Bit-Sequencer Processor (U.S. Pat. No. 6,115,083)
Bit-Plane Formatting using a Corner Turn (U.S. Pat. No. 5,598,188)
White Segment Processing (U.S. Pat. No. 6,453,067)
Spoke-Light-Recapture (U.S. Pat. No. 6,324,006)
Secondary Color Boost (U.S. Pat. No. 6,567,134)
Clock Dropping (U.S. Pat. No. 5,912,712)
Noise-Free Boundary Dispersion (U.S. patent application Ser. No. 09/088,674, filed Jun. 2, 1998)
Blue-Noise STM (Spatial Temporal Multiplexing) (U.S. patent application Ser. No. 09/795,402, filed Feb. 26, 2001)
Clock Dropping Bit-Weight Correction Technique (U.S. Pat. No. 5,912,7121 and co-pending U.S. patent application Ser. No. 10/458,045.

The present invention can be utilized with a new Data Formatting and PWM method. This includes the concept of curved bit-slices, mixed-bit bit-plane formatting, DMD loading, DMD resetting, clock dropping, and the DMD event timing for achieving the desired SC bits on the DMD. Also included are any techniques used to mitigate any new artifacts created by aspects of this invention (e.g., see Double-Skew artifact below). The new Phased Reset method is included because DMD loading and resetting are an integral part of the preferred PWM method for this invention. Clock Dropping is included because this directly affects the PWM timing for bits displayed when using this invention and allows the mitigation of the AC lamp artifacts. Unless these artifacts are removed this overall invention is not viable for AC lamps.

With this invention, the following color wheel design techniques for boosting lumens that were listed above for FSC projectors, can still be used for maximizing CWE in a SC projector:

Asymmetrical segment sizes allow a proportionally larger green segment. Green has the most lumens so the screen brightness is increased.
Overlapping dichroic color filters to share parts of the lamp light spectrum between different color dichroic filter segments (for RG and GB filter boundaries).
Using very steep dichroic filter slopes to reject out-of-band light allows even more filter overlapping, to boost lumens, without degrading colors.

When utilizing aspects of this invention with the three-color wheel design items above, SCR can boost CWE from 48% for an FSC projector to 72% for a SCR projector while matching the White Peaking and RGB color coordinates of the FSC projector.

Scrolling color bands result in continuously repeating "color cycles" from the DMD point of view. A color cycle is defined as a complete scrolling cycle of all color bands and spokes on the DMD. From some spatial start position on the DMD the color bands and spokes scroll until they return to the same starting position. Typically three, four, or six color cycles will occur during one input video frame with this invention. Three color cycles are assumed in what follows unless stated otherwise. This is sometimes referred to as a "3×" color cycle rate.

Figure 4:
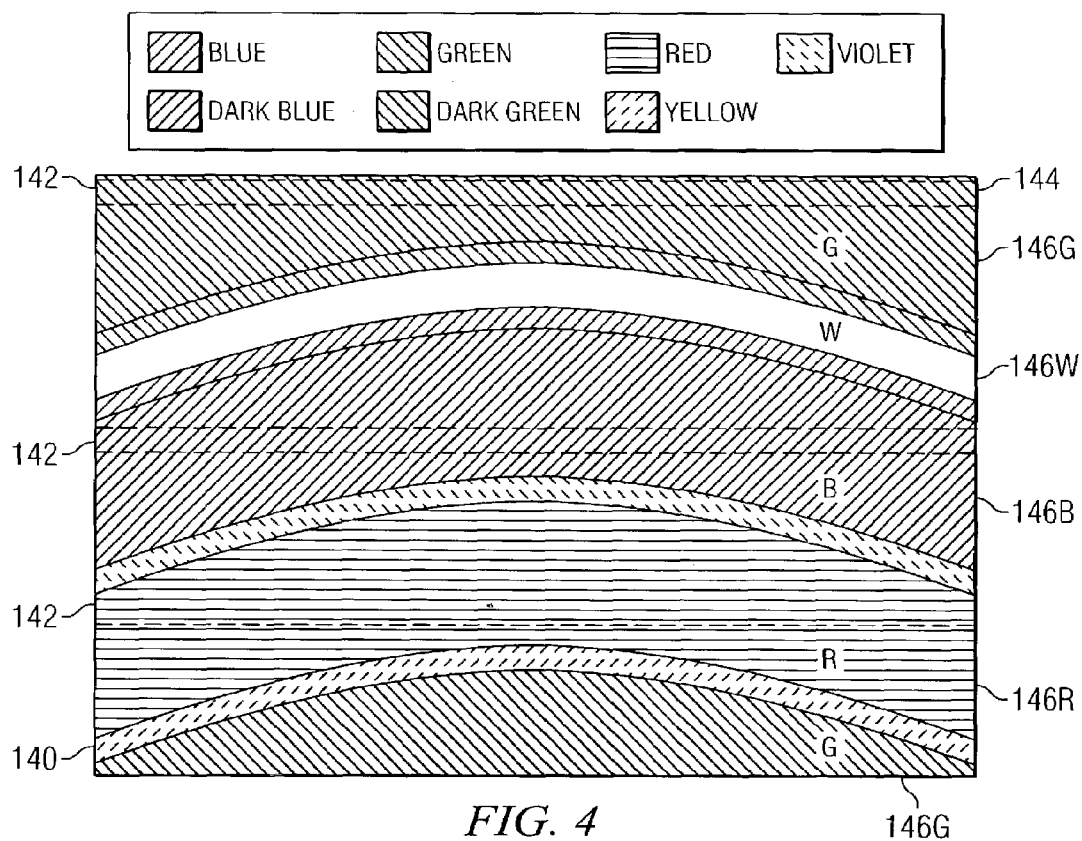
FIG. 4 shows the color scheme as illuminated on the top of a DMD.

FIG. 4 shows the color scheme as illuminated on the top of a DMD. The arrow on the right-hand side of the figure illustrates that the color bands 146 (labeled G, W, B and R) scroll in the upward direction for GWBR order. Spoke regions 140 are formed on the DMD when using an SCR color wheel. There are many contributors to spoke sizes. Pure color zones 142 in the R, G, and B portions are also shown. Pure color zone positions shown occur at VSYNC. Rectangular portions 144 within these color zones are used by the preferred embodiment of this invention, as will be described later.

The preferred embodiment of this invention generates bit-planes that are in "mixed-bit" format. That is, unlike FSC systems, most of the bit-planes applied to the DMD contain bits that are not the same type for many pixels on the DMD and the bits may be from multiple colors and spokes. And many bit types may exist in a mixed-bit bit-plane within the same color. For example, a mixed-bit bit-plane may contain bits R2, R3, R4, G12, RGSpoke1, and RGSpoke2 for some of the pixels in this bit-plane.

A bit-mapped spatial re-mapping circuit (e.g., within data formatter 256 in FIG. 1b) is used to create the new mixed-bit bit-planes. This circuit is implemented after the video processing that is performed on pixels in DMD-based projectors and just before the Corner Turn, which is a method of bit plane reformatting. The circuit that creates the mixed-bit bit-planes from the R, G, B, and W processing channel busses is referred to as the Scrolling Color "SuperMux" because of the extensive multiplexing performed for the re-ordering of bits that is required.

SuperMux input bits are mapped to the SuperMux output bit-plane data such that the input bits are mapped into curves within the bit-planes. These curved bits match the curvature of arcs projected on the DMD. The curved bits are called "bit-slices" and labeled as element 146 in FIG. 4. As can be seen, each color band R, G and B includes a number of bit slices 146. A SuperMux input bit will uniquely control a curved bit-slice on the DMD. Each curved bit-slice is the same number, or very near the same number, of vertical pixels tall at all positions of the bit-slice on the DMD. Each color has an integer number of curved bit-slices that scroll down the DMD.

FIG. 5 shows how bits are applied to the DMD. In this example, all color bands cycle by three times per frame (3×). Each bit-slice steps 12 pixels spatially upward (or downward) at each DMD reset. Each bit-slice steps upward spatially to replace the next slice position above it. Non-LSBs (for R, G, B, W and spokes) are displayed as curved bit-slices. The RGB LSBs are displayed as rectangular bit slices. The W LSBs are curved.

The intensity of each color can be controlled by controlling the amount of time that color is provided to any individual DMD pixel. For example, consider the green colors only. In this example, the design goal is to have 256 levels of green intensity. Sixteen of these levels, which can be indicated by four bits referred to as the MSBs (most significant bits), are determined by the 12 pixel slices. If there are sixteen of these slices in a color band, then sixteen levels of intensity can be controlled. For instance, if the only one slice is selected (and each reset time is 80 μs), then the green will be displayed for only 80 µs. The rectangular bit slices can be used to generate the least significant bits (LSBs), as will be described below.

Bit-slices, when using SCR, have slightly changing area and shape on the DMD as they scroll. But each bit-slice has the same "constant bit-weight" for all positions on the DMD. For an SCR wheel, the bit-slices will become more curved toward the bottom of the DMD. This invention handles this by allowing the additional curvature to be mapped into the curved bit-slices in the SuperMux output bit-planes.

The area of a bit-slice stays nearly constant for all positions on the DMD. However, the bands change speed slightly. This change in speed is small but it can change the bit-slice height and area that is required to maintain constant bit weights. The preferred embodiment of this invention allows the adjustment of bit-slice height and area to assure that each bit-slice has the same constant weight at all scroll positions on the DMD. Constant weight for a bit-slice means that all pixels turned on by this bit-slice have the same on-time when this bit-slice is applied to them.

The curved bit-slices are also used within the spokes so that SLR can be used with this invention. Since spoke bit-slices can be assigned to closely approximate use the spoke regions of mixed colors without the spoke bit-slices intruding into the pure color area of the color bands, no penalty in spoke size is incurred with the preferred embodiment of this invention due to having curved spokes. In fact, the preferred embodiment of this invention makes spokes as small as they can possibly be for a given optical system.

Using a W color band is optional with this invention. If a W segment is used it can be of the same size as today's FSC projectors because the spokes, when using this invention, are of similar size to today's FSC projectors. For example, the white segment can comprise about 52° out of a 360° wheel.

Bit-slices spatially fit into an integral number within the overall height of the DMD. For all that follows this is assumed to be 64 bit-slices. For an XGA DMD (1024×768 pixels), this gives curved bit-slices an average height of 768/64=12 pixels on the DMD. For a typical SCR system all bit-slices will not have a vertical height of exactly 12 pixels for all positions on the DMD. Typically this will vary by 12+/−1 pixel.

The curved bit-slices are used as "non-LSBs." These non-LSBs are R, G, B, W, and spoke bit-slices. RGB LSBs are not generated by using curved bit-slices. They are applied as rectangular RGB bit-slices as described later. White LSBs, however, are applied as curved bit-slices as also described later.

The basic operation of the preferred embodiment of the invention is easiest to understand if the DMD is being globally reset at a constant rate. That is, all of the memory cells under the mirrors are loaded with data and then all pixels on the DMD are simultaneously reset so that this data is applied to the mirrors. FIG. 6 shows the timing for this global reset timing. FIG. 7 shows the bit weights for one exemplary system. The differences in weights can be due to the differences in the number of slices for each color in the color wheel and can vary for different systems.

The bits, within the bit-planes, are applied to the DMD as curved bits. Assuming all curved bits are 12 pixels tall, each bit-slice steps 12 pixels spatially downward (or upward) at each DMD global reset. Each bit-slice steps downward spatially to replace the next slice position below it. Thus the bit-slices step downward nearly instantaneously at each global reset. Color band bit-slices "step" rather than continuously "scroll."

FIG. 8 shows the basic stepping time calculation for each bit-slice assuming that the bands move at a constant rate. Thus, each bit-slice steps to the next position every 86.8 µs, assuming a 60 Hz frame rate. This equation can easily be varied if a particular system uses other criteria, e.g., a different frame rate, a different color repetition rate (e.g., color cycles per frame), or a different number of slices.

A problem arises if the PWM technique uses only curved bit-slices. In this case, all R, G, B, and Spoke bit-slices behave identically in all three color cycles. A curved bit-slice within a color cycle is a "bit-split" of an R, G, B, or Spoke bit. For a given curved bit-slice all bit-splits for a pixel are either always ON or always OFF during the 3 color cycles.

Therefore, the net weight of a curved bit-slice over a video input frame is much larger than what is desired for the LSB of a color. The smallest R, G, or B LSB needed to be applied to the DMD is typically 1 on a 256 scale for 8-bits of bit-depth per color applied to the DMD. A single curved bit-slice bit-split within R, G, or B has a typical bit weight of 5.0 within one color cycle. But over the entire frame it is 3×5=15 because each bit has 3 bit-splits. This is much too high to achieve 8-bit per color bit-depth on the DMD. Dithering techniques to increase bit-depth, such as Spatial Temporal Multiplexing (STM), could be used but this would generate extreme dither noise in the displayed images.

As a result, the preferred embodiment provides a method of applying LSBs to the DMD with weights as low as 1.0. That is, a method of displaying short on-time "real" LSBs, not effective short on-times created via dithering, is provided. FIG. 7 shows a set of typical bit weights for R, G, and B non-LSBs for a 3× color cycle projector.

With the preferred embodiment of this invention, R, G, and B LSBs are formed by using "rectangular" bit-slices within each R, G, and B color band as opposed to the non-LSB curved bit-slices. These bit-slices are the same height as the curved bit-slices. On the color band, it is required that "Pure Color Zones" exist as shown in FIG. 4. These pure color zones are needed so that R, G, and B LSBs can be loaded into the DMD as rectangular bit-slices where all pixels in these bit-slices have the same pure color.

There are several reasons why rectangular bit-slices are used for RGB LSBs rather than curved bit-slices. First, rectangular LSBs can be loaded with a unique LSB value in each color cycle. This requires more bit-planes in memory to contain the LSBs. However, if curved bits are used for LSBs then a large number of bit-planes would be needed as explained later. So using rectangular LSBs helps reduce the overall bit-plane count with this invention. In another embodiment, stair stepped LSBs can be used.

In addition, rectangular LSBs are easy for the sequencer to quickly reload to create two LSBs per color cycle. For the case of global resetting, as described above for curved non-LSBs, additional "sub-global" resets can be performed on only the 3 (of 16 typically) DMD reset blocks that happen to currently contain the RGB LSB rectangular bit-slices. Thus the Sequencer can reload the LSB bit-slices between global resets and two LSBs per color can be created within a single color cycle.

FIG. 9 shows how the LSB reload and sub-global reset timing work to create two LSBs per color. Two bits are formed, a lower weighted LSB and its "complement." For a single color cycle bit-slice weight of 5.0, for example, two LSBs could be formed with weights 1.0 and 4.0. A typical on-time for a LSB bit with a weight of 1.0 is 15 µs. Since each LSB bit-slice can be reloaded faster than 15 µs (for a DMD that achieves global reset-to-reset time in FIG. 8) then LSBs as short as 1.0 are possible when the rectangular bit-slices are used. Therefore, LSB times with this invention are as short as today's FSC projectors, which achieve a lowest LSB weight of approximately 1.0.

Another advantage of using rectangular bit-slices is that no DMD or board bit-plane RAM bandwidth is wasted due to loading redundant data. If curved bits were used for RGB LSBs, much larger regions of the DMD would need to be reloaded before each sub-global reset. A larger area is needed because the DMD must be loaded in rectangular sections (sets of complete rows of data). So all rows containing the LSB must be reloaded. But most of the data loaded into a row containing the curved LSB bit-slice is simply a reload of the non-LSB data already under the mirrors. So redundant loading takes place. With rectangular LSB bit-slices only the memory cells under the LSB mirrors are reloaded. No RAM read bandwidth or DMD load bandwidth is wasted due to redundant data reloading. Thus, using curved bit-slices for LSBs would prevent the possibility of achieving bit weights of 1.0 unless very expensive bandwidth increases were made to the DMD interface and board RAM chips for the faster loading of bit-planes.

Further, if the RGB LSBs used curved bit-slices then the sub-global resets would need to be applied to more than just three DMD reset blocks on the DMD. Curved bit-slices spill over into multiple DMD reset blocks. Rectangular bit-slices, on the other hand, are always in only a single reset block for a given color. For example, if a reset block is 48 pixels tall then a 12 pixel tall rectangular bit-slice has four spatial stepping positions within a reset block before it steps completely into the next reset block. This minimizes the number of blocks that must receive the sub-global resets in each color cycle. If more resets are performed per color cycle then a contrast ratio penalty can result due to the slight movement of mirrors even for black (OFF) pixels.

All curved non-LSBs have a common weight for a given color. Therefore, the LSB weights must be chosen so that 256 shades per color can be formed with no missing codes or linearity errors. For example, green bit weights might become:

1,2,2,3,3,4, 15,15,15, . . . 15 (sixteen 15's total)

256 shades per color can then be created in steps sizes of 1.0:
For green: 1, 2, 1+2, 4, 1+4, 2+4, . . . 1+2+3+3+4, 2+2+3+3+4, 15, 15+1, . . .

More (or less) than 3x color cycles can be used with this invention as long as 1 or 2 more RGB LSB bits per color are added for each additional color cycle. This is desirable because the sum of all LSBs needs to be nearly equal to (within +/−1.0) the weight of all the bit-splits of one curved non-LSB bit-slice. This is used to create 256 color shades in steps of 1.0. For increasing the magnitude of the color shade, once all of the LSBs are turned on, the sum of the LSBs should preferably sum to within +/−1.0 of the weight of first curved bit-slice to be turned on. If not, then a step of more than 1.0 will occur when this curved bit-slice turns on and all the LSBs turn off. For example:

14=2+2+3+3+4+0 (all LSBs are ON and the first curved bit-slice is OFF)
15=0+0+0+0+0+15 (first curved bit-slice turns ON)

In the case of higher color cycles per frame, two LSBs per color are not needed in every color cycle. For example, 6x operation would give twelve LSBs per color if two LSBs were created in each color cycle. However, for 6x, six LSBs per color in a frame are sufficient to create a 256 code color shade in steps of 1.0. Having less than two LSBs per color cycle is beneficial because this reduces the total number of bit-planes.

The rectangular LSB bit-slices are spatially overlaid on the curved bit-slices. Then the curved slices are horizontally slid over until the intersected curved bit-slice still has a vertical net height of 12 pixels at all points even though the bit-slice is spatially separated. This approach allows the weight of each curved bit-slice to retain the same weight of a non-intersected curved bit-slice. This can be seen in FIG. 10.

In the example of FIG. 10, all curved bit slices 146 have the same on-time. All slices 146 are 12 pixels vertically tall even if curved slices are separated spatially due to the rectangular LSBs 144.

It should be pointed out that the DMD block getting the sub-global reset contains both LSB and non-LSB bits. Since non-LSB data behind mirrors is unchanged in the block, these extra block resets do not change the state of the non-LSB mirrors. But a small contrast ratio penalty occurs due to very brief mirror movement that occurs at each reset. The mirrors break loose briefly at each block reset, for all mirrors in that block, regardless of the data in the mirror's memory cells. (This is why it is best to minimize the number of block resets per color cycle as mentioned above. Using rectangular LSBs, instead of curved LSBs, minimizes the number of times a block is reset during a color cycle.)

Since the Sequencer re-loads LSB data once between global resets, it should be able to write the DMD in a "row addressable" mode. The DMD is not loaded from "top-to-bottom" as is usually done in today's FSC systems. Thus for the preferred embodiment of this invention, the DMD should include the feature of being row addressable.

With the preferred embodiment of this invention, the color wheel diameter size limit is set by when the color band curvature becomes so pronounced that the rectangular LSB bit-slices, that fit into each R, G, and B color band, can no longer be of a pure color. A rectangular pure-color zone (e.g., twelve lines) within each color band is needed to accommodate the LSBs. The SCR color wheel can be reduced in diameter until this limit is met. This size limit is typically 25 mm when using a resonator rod with a diagonal of 9.8 mm and 8-segment wheel (RGBWRGBW) printed with the spirals of Archimedes.

For smaller color wheels the curving of curved bit-slices is more dramatic. But the curved-bits slices still map into the spokes so that the spokes are not enlarged. Thus, as long as the LSB pure-color zones are maintained, ultra-small color wheels can be used with no penalty in spoke size.

Data is written to the DMD as curved bit-slices for the non-LSBs with this invention. However, the Sequencer loads the DMD with complete horizontal rows of data. The curvature of bits on the DMD creates variable length segments of types of bits within a DMD row. The Sequencer cannot efficiently read the variable length segments from the bit-plane RAM and then load this data into the DMD if the non-LSB bit-planes each contain a unique bit type. The Sequencer would have to jump between bit-planes many times while loading every line of the DMD. Thus, the bit-planes must contain data that is pre-formatted so that the Sequencer can simply read complete rows of data from the bit-plane RAM and then load these complete rows of data into the DMD. This bit-plane pre-formatting is done in the SuperMux, which pre-mixes (re-orders) the bits contained in the mixed-bit non-LSB bit-planes before they are written to the bit-plane storage RAM.

At least three classes of bit-planes can be used by this invention. These are defined as:
CLBP—"Color LSB Bit-Plane." Is a Same-Bit BP containing R, G, or B LSBs.

NLBP—"Non-LSB Bit-Plane." Is a Mixed-Bit BP containing no R, G, B, or W LSBs.

WLBP—"White LSB Bit-Plane." Is a Mixed-Bit BP containing W LSBs.

Figure 11:
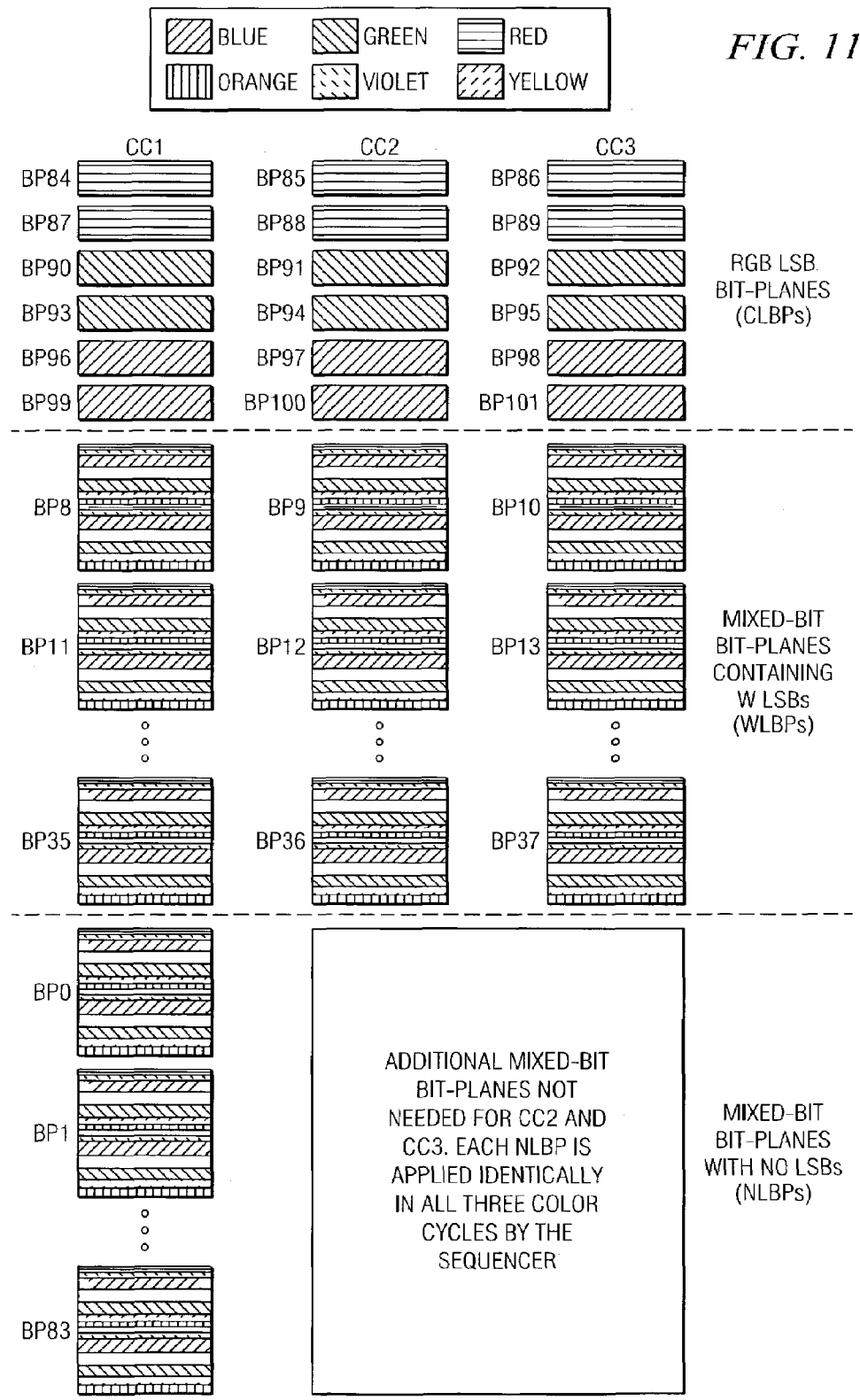
FIG. 11 shows an example complete set of bit-planes using these three types of bit-planes.

FIG. 11 shows an example complete set of bit-planes using these 3 types of bit-planes. The CLBP contain the rectangular RGB LSB bit-slices. They contain "same bit" data rather than "mixed-bit" data. The WLBP contains the W band LSBs, which must use a different LSB timing method than RGB LSBs (to be discussed later). The NLBP contain the non-LSB curved bit-slices (contains no R, G, B, or W LSBs). The NLBPs are mixed-bit bit planes. The WLBPs are also mixed-bit bit-planes but they include a single W LSB for each color cycle as well as some non-LSB bits, which are the same in every color cycle. W LSBs, unlike RBG LSBs, are curved rather than rectangular.

In FIG. 11, unique bit-planes are needed in each color cycle (CC1, CC21, CC3) for the CLBPs. This is because the RGB LSBs must be uniquely controlled in each color cycle. For 3× operation, six LSB bit-planes are needed per color since two LSBs are applied per color in each color cycle via the sub-global resets. Likewise, the WLBPs are unique in each color cycle since a unique W LSB is needed in each color cycle. But, unlike when the CLBPs are applied to the DMD, no sub-global resets are used with the WLBPs. The NLBPs are used identically in each color cycle since all curved non-LSBs behave identically in each color cycle. Curved non-LSB bit-slices have three bit-splits per input frame for 3× operation.

Figure 12:
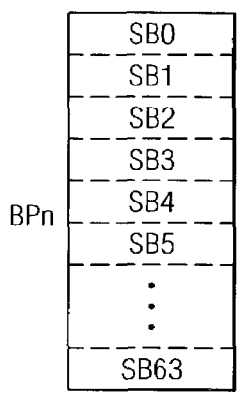
FIG. 12 shows the internal spatial bit-plane structure used for all three bit-plane types.

FIG. 12 shows the internal spatial bit-plane structure used for all three bit-plane types. Data is organized into "sub-blocks" (labeled SB0, SB1, . . . SB63), which are spatially contiguous on the DMD. The sub-block size is typically chosen to be the same vertical height as an LSB rectangular bit-slice (e.g., 12 rows tall). Each CLBP is a collection of 64 rectangular bit-slices of the same color and bit weight. (Sixty-four was selected since 12×64=768, the pixel height of an XGA display and also a sub-multiple of reset group size.) NLBPs and WLBPs also use the sub-block structure but each sub-block is a mixed-bit sub-block. For all bit-plane sub-blocks SB0-SB63 in the bit-plane correspond to spatially contiguous "sub-blocks" on the DMD.

Figure 13A:
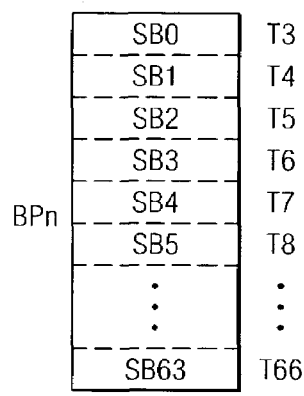
FIGS. 13a and 13b show how the sub-blocks within a bit-plane are temporally mapped within a color cycle.
Figure 13B:
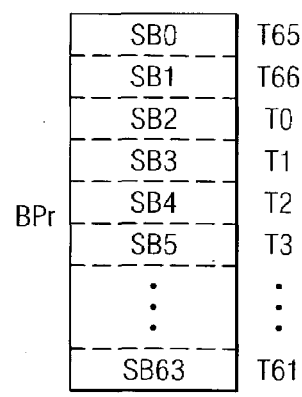

The Sequencer reads one complete sub-block within a bit-plane and then jumps to another sub-block within another bit-plane. FIGS. 13a and 13b show how the sub-blocks within a bit-plane are temporally mapped within a color cycle. Thus, a bit-plane does not have its data continuously applied to the DMD until the entire DMD is full as is the practice with FSC systems. Instead, sub-blocks are read from different bit-planes as the DMD is filled.

In FIGS. 13a and 13b, each sub-block with a bit-plane has a different display time assigned to it with a color cycle. Due to "vertical overscan" of the DMD, there are typically 67 display intervals during a color cycle (1.06×64−1≅67). The bits being displayed for a bit-plane scroll off the DMD into the overscan area. Thus no sub-blocks are needed for three time slots within each bit-plane. In FIG. 13a, no sub-blocks are used for T0–T2 while in FIG. 13b, no sub-blocks are used for T62–T64.

After the sub-blocks are loaded into the DMD and the DMD is globally reset, the sub-blocks step down the DMD, as do the bit-slices contained within these sub-blocks. For the CLBP, the sub-blocks and bit-slices are the same pixel area regarding the data stepping downward on the DMD. However, for the NLBPs and WLPBs, the curved bit-slices are spread over several sub-blocks and these sub-blocks are spread over several bit-planes. As far as the PWM goes, the stepping of curved bit-slices is one goal of the preferred embodiment of this invention. The stepping sub-blocks are just a result of the way the bit-planes are formatted which is a convenient way to read RAM data for displaying the curved bit-slices. The Sequencer reads sub-blocks so that it can "re-assemble" the curved bit-slices on the DMD. Since curved bit-slices do not fit within one sub-block, a complete bit-slice is spread over multiple bit-planes.

FIGS. 13a and 13b indicate that there can be more than 64 temporal sub-block assignments, over a color cycle, where some are "virtual sub-blocks" that are in the overfill area. In this case each bit-plane still contains 64 sub-blocks but there are some missing sub-blocks in the 64 time slots that the DMD displays during a color cycle.

Figure 14:
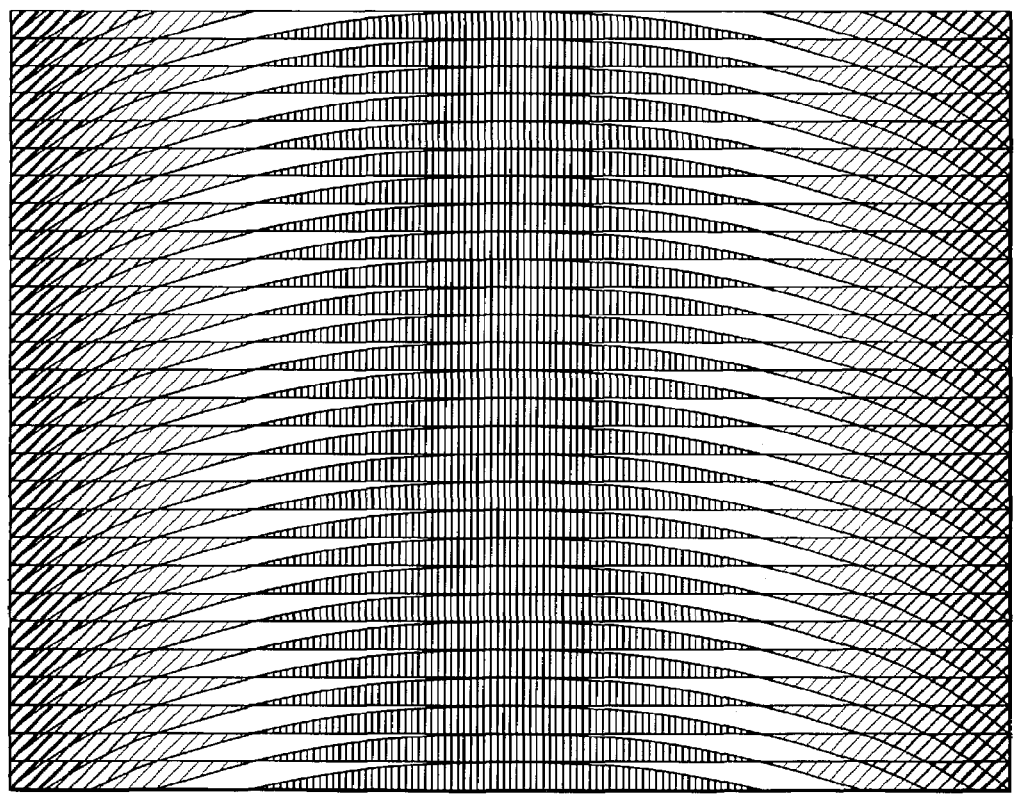
FIG. 14 shows an example of the images contained in the sub-blocks for one mixed-bit bit-plane.

FIG. 14 shows an example of the images contained in the sub-blocks for one mixed-bit bit-plane. This bit-plane could be either an NLBP or a WLBP. If all bits behave identically in all color cycles then it is an NLBP. But if one or more of the curved W LSBs changes uniquely in a color cycle then it is a WLBP. In actual practice the image within sub-blocks would change slightly for different positions on the DMD since the curvature of bits changes slightly.

Figure 15:
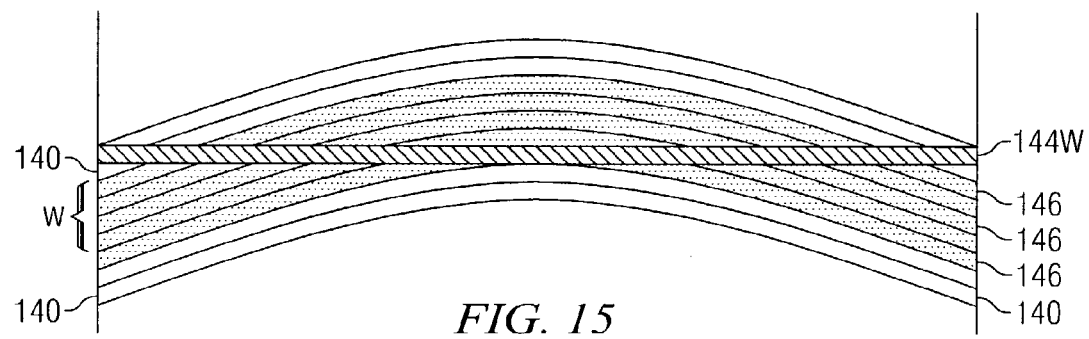
FIG. 15 shows an example where rectangular W LSBs do not fit into a W band.

FIG. 15 shows a problem when rectangular W LSBs do not fit into a W band. W LSBs are needed because if only curved W non-LSBs are used then the shortest W LSB on-time is a curved bit that behaves the same in all 3 color cycles (3 bit-splits). For optimum performance of SLR (e.g., lowest image artifacts), it is desirable to have a bit weight of a single bit-slice within one color cycle. Unlike RGB LSBs, an LSB weight less than one bit-slice is not needed for SLR. Therefore, no sub-global resets are needed for W LSBs.

If the W LSB cannot be rectangular due to the size of the largest slice used, it must be a curved LSB. A primary reason why the bit-planes are organized into sub-blocks is to allow curved LSB bit-slices within the W band. The number of sub-blocks vertically spanned by a curved W LSB must be duplicated for each color cycle. Since each unique sub-block type requires one bit-plane, the number of sub-blocks vertically spanned by a curved W LSB causes a corresponding increase in the number of bit-planes needed for a color cycle. In addition, for each additional color cycle that needs a W LSB controlled independently of other color cycles, another set of these bit-planes is needed. Thus the W LSBs require many additional bit-planes. And the more curvature that bands have the more bit-planes that are needed. An example number of additional bit-planes needed for W LSBs, as shown in FIG. 11, is calculated by: 10 sub-blocks spanned by W LSB×3 color cycles=30 bit-planes needed for 3 independent W LSBs.

Note that if rectangular bit-slices could be used for the W LSBs, only 3 bit-planes would be required to control the W LSBs. Thus, using curved W LSBs increases the number of bit-planes needed (by 30−3=27, in the example above).

FIG. 16 shows an example of the white LSB region on the DMD. The white LSB slice is labeled with reference numeral 150. The other white slices 152 are adjacent the LSB slice 150. Adjacent the white band on one end are BW spoke slices 154. WG spoke slices 156 are adjacent the white band on the other end. A portion of blue slice 158 is also shown.

Figure 17:
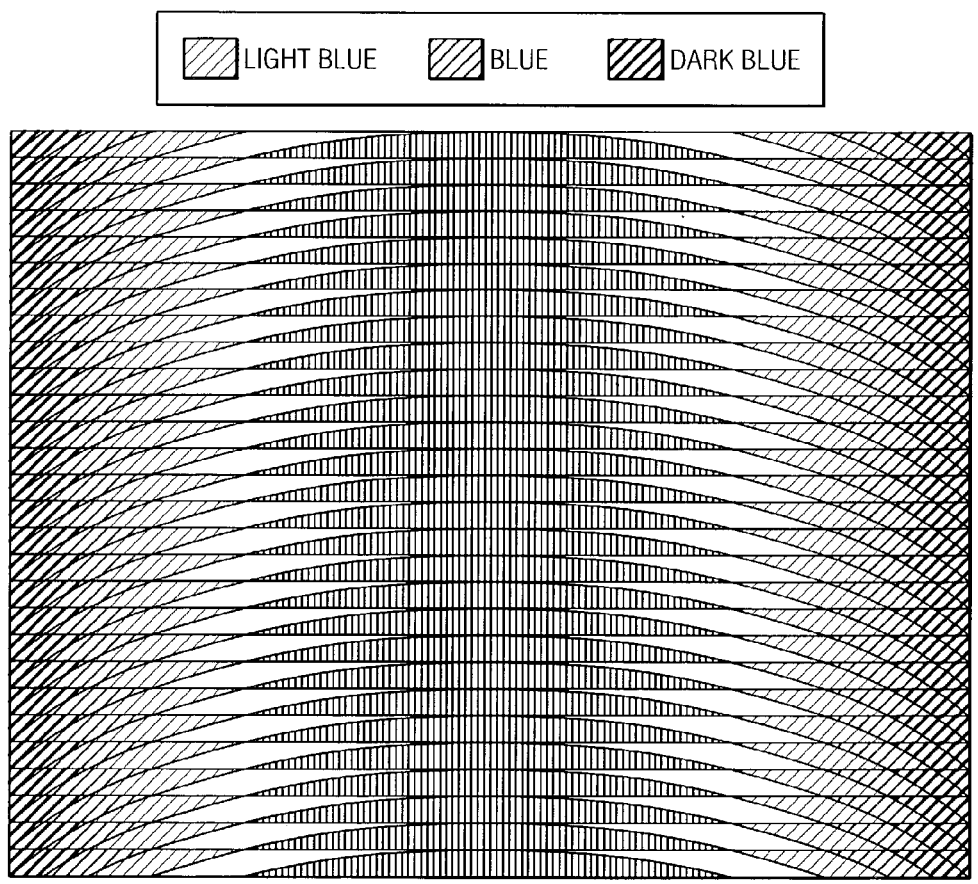

FIGS. 17 and 18 show examples of sub-blocks (and bit-planes) from this region. Sub-blocks for this region contain the W LSBs but they also must contain the bits that are not W LSBs. Only the W LSB changes uniquely in each color cycle.

Referring to FIG. 16, region shown is 72 pixels tall in this example. The white LSB is different in each color cycle.

Other white slices are repeated in all color cycles. For the bit-plane patterns in FIGS. 17 and 18, the patterns fill the entire DMD array. The sequencer reads WLBPs from RAM, which will reassemble the entire white LSB region, as the white LSB scrolls down (or up) the array.

Since no reloading of the WLBPs is needed between global resets, no additional bit-plane RAM and DMD bandwidth is needed for an LSB reload operation like is required for RGB LSBs.

Although different WLBPs are loaded in each color cycle, no bit-plane RAM or DMD bandwidth is wasted because there is no redundant data loaded around the W LSBs. Using only a single unique W LSB within a color cycle does not increase the bandwidth needed for reading the bit-plane RAM and loading the DMD. This is because no reloading of the W LSB curved bit-slices is used which would cause loading of redundant non-LSB data.

It can now be seen that if RGB LSBs used curved bit-slices that many, many more bit-planes would be needed. This is because the reloading of LSBs requires another set of bit planes in each color cycle. So the 30 bit-planes calculated above for WLBPs becomes 2×30=60 bit-planes for each R, G, or B color. So for total RGB LSB bit-planes, if curved bit-slices were used for RGB LSBs, then 60×3=180 bit-planes. Thus, regarding the number of bit-planes, it is clear that rectangular RGB LSBs are best. Instead of 180 bit-planes to support the RGB LSBs, only 18 are needed as shown in FIG. 11.

If curved bit-slices were used for the RGB LSBs, the reloading prior to the sub-global reset would take the time required to reload 10 sub-blocks (per example above) rather than just one sub-block used with rectangular LSBs. This would not allow RGB LSBs to be formed as short as 15 μs which is required to form a bit weight of 1.0 in each color. Thus RGB LSBs need to use rectangular bit-slices.

A row of pixels on the DMD that gets loaded with data from one bit-plane can have different bits of the same color. And a row may contain bits from a different color and/or spoke bits. Thus, the scrolling color SuperMux function is needed to create the mixed-bit bit-planes. Since bits within bit-planes are stored pre-mixed, no DMD load time penalty (or RAM read penalty) occurs due to reading mixed-bits during a Sequencer bit-plane RAM read. Data can be read from RAM in complete rows of pixels with no address jumping to other bit-planes needed at bit-slice boundaries within a row. If address jumping was needed, then a significant reduction in average read bandwidth for the bit-plane RAM will occur for mainstream industry DRAM ICs. These DRAM ICs are not designed for totally flexible random access.

The SuperMux takes in the R, G, B, W, and Spoke busses from the pixel processing chain and re-maps (re-orders) these bits so that when they are written to the bit-plane RAM the correct bit-planes are formed. This remapping function is complex in terms of signal routing and the number of individual multiplexers due to the number of bit signal lines involved in the transformation.

Input bits to the SuperMux are arranged in conventional groupings of contiguous bits for each of the R, G, B, and Spoke Busses. The output of the SuperMux will be written to the Corner Turn buffer circuit at every pixel clock time. Each individual signal at the output of the SuperMux outputs the data to completely construct one unique bit-plane over one frame time.

So the SuperMux receives bits of data as inputs and each SuperMux output signal is for building one bit-plane. Each input bit controls the displaying of one bit-slice on the DMD. Thus, the SuperMux takes in bit-slice data as inputs and outputs bit-plane data.

The Corner Turn is needed to buffer the SuperMux output bits so that larger words can be written to RAM for adjacent pixels within bit-planes. This is the same practice used in today's FSC systems. Each Corner Turn output word will contain only bits within the same bit-plane. The Corner Turn exists to allow the writing of RAM words that are only within a single bit-plane. This is needed for efficient writing and then reading of the RAM for optimizing R/W bandwidth.

Thus, the preferred embodiment of this invention allows very small color wheels since the limit to diameter is set by the LSB pure color zones. Without this invention, where spoke bits are rectangular, the color wheel size limit is set by the spoke size due to curvature. This makes for much larger color wheels since even small amounts of curvature significantly increase spoke sizes.

Figure 20B:
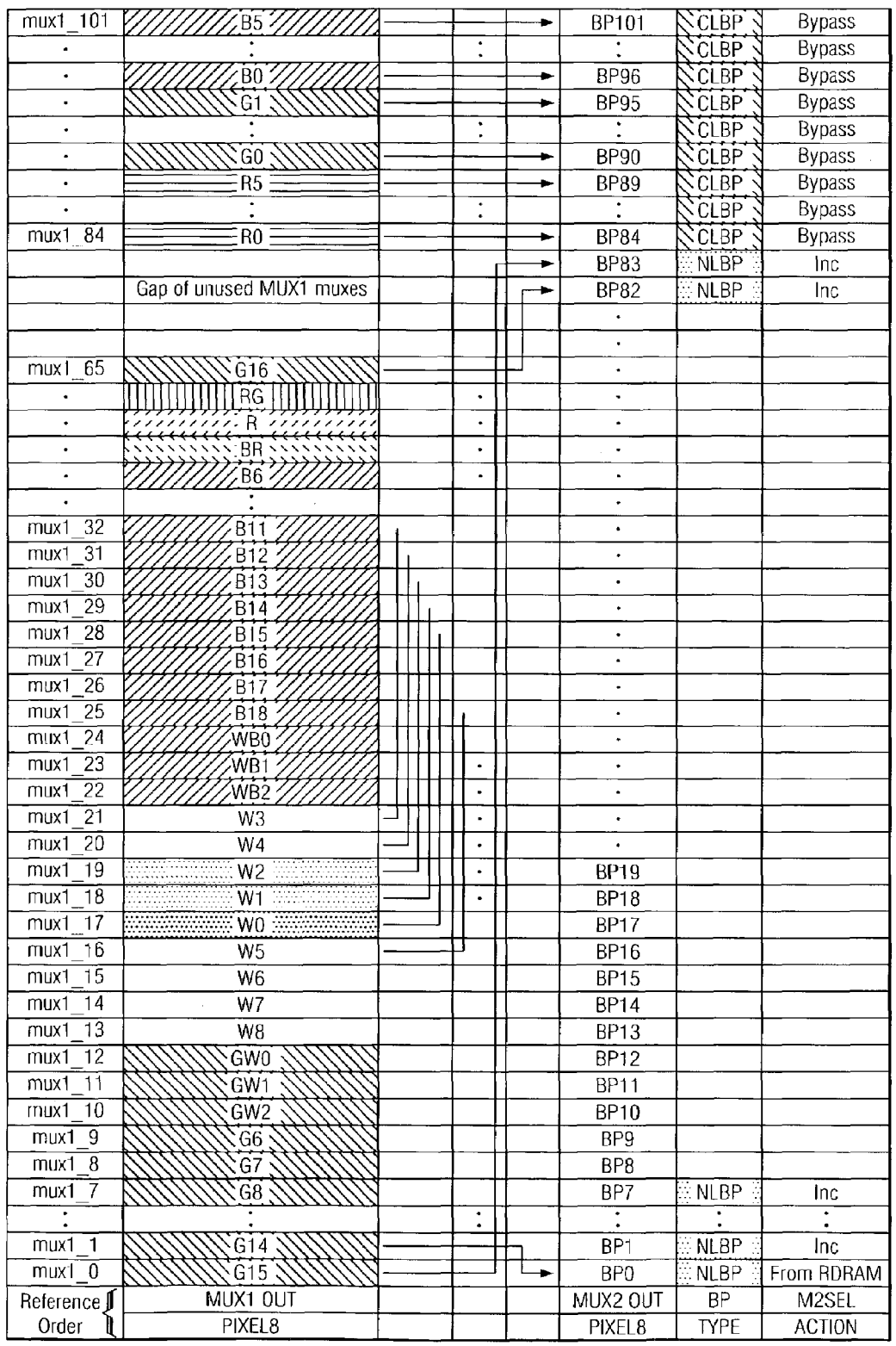

FIG. 19 shows an example (for pixel 0 on the DMD) of how SuperMux input bits map to SuperMux output signals where each output signal builds up a unique bit-plane over time. The SuperMux mapping changes each time the input pixel spatial location on the DMD crosses a transition boundary into the next bit-slice. FIG. 20 shows an example for pixel 8, which crosses the boundary from where pixel 0 was. The embodiment section of this disclosure will show one feasible way to implement the SuperMux where SuperMux input-to-out remapping can be performed within a single pixel clock time.

Figure 21A:
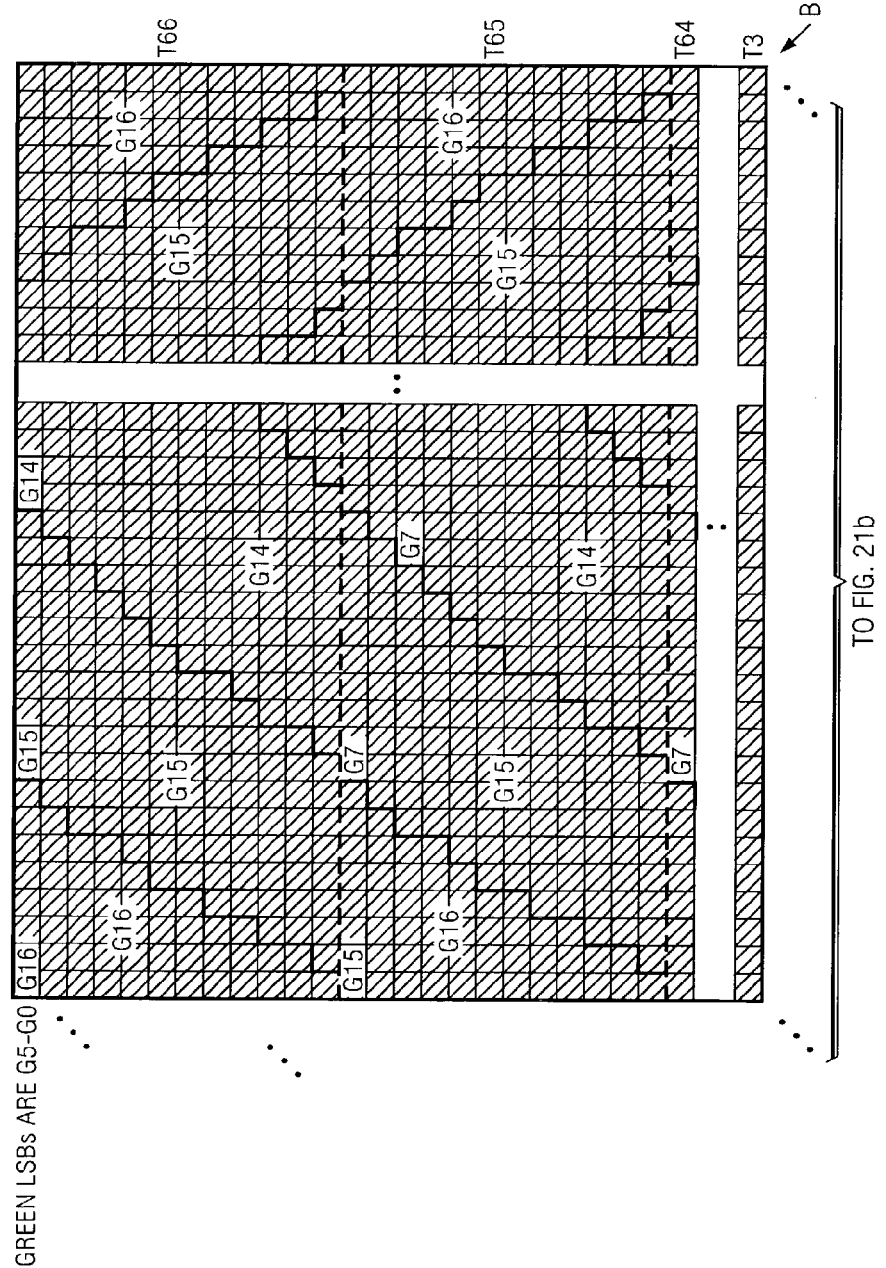
Figure 21B:
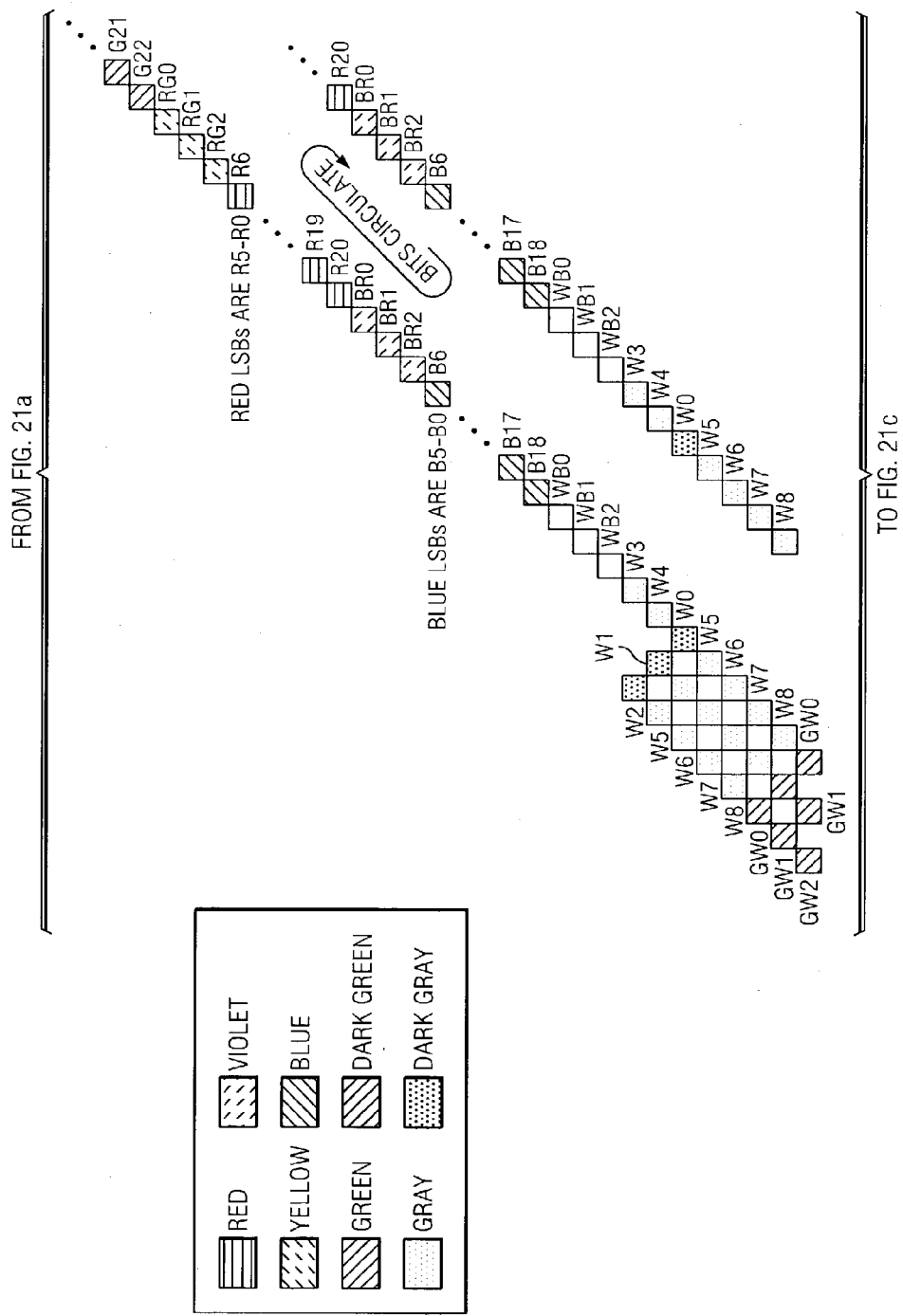

FIG. 21 shows how the full set of bit-planes created by the SuperMux are organized. Both the internal spatial content of a bit-plane is shown as well as how the sub-blocks map temporally to the DMD. This example assumes that there is overscan on the DMD so that 67 sub-block time positions exist within a color cycle. But each bit-plane contains only 64 sub-blocks—so some sub-block time slot assignments are missing from each bit-plane.

Figure 22A:
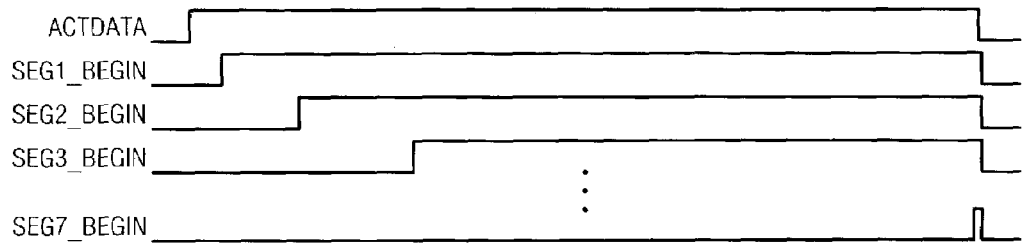
FIGS. 22a–22c illustrate a SuperMux output during an active row cycle.
Figure 22B:
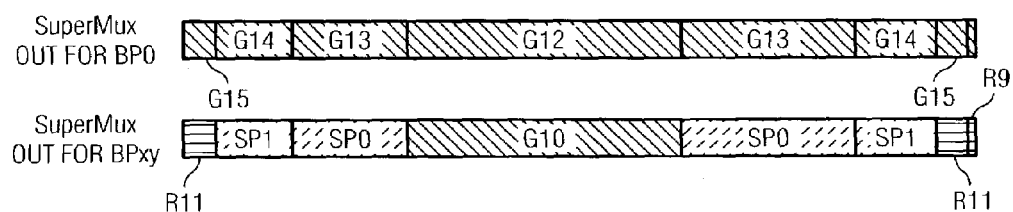
Figure 22C:
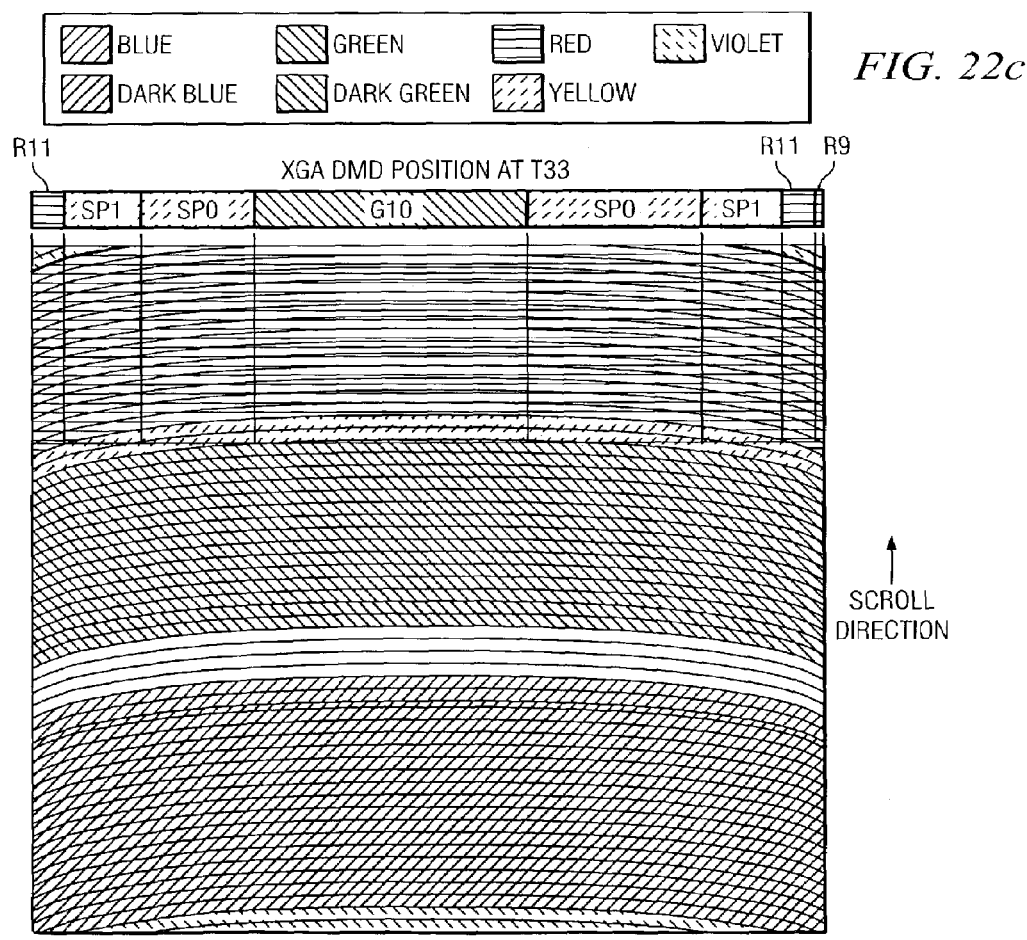

It can be seen that the SuperMux must shift the order of signals that it outputs at each bit-transition point, due to the curved color boundaries, on a DMD row. FIGS. 22a–22c (collectively FIG. 22) show some timing signals that must be generated during each line of input data from the video source. In the timing diagram of FIG. 22a, the ACTDATA line shows when the data is active. The SEGx_BEGIN signals are used to tell the SuperMux to shift the order of the SuperMux output signals.

FIG. 22b shows a row of pixel data for the signal out of the SuperMux labeled BP0. BP0 out of the SuperMux, over the time of an entire input frame, will output all of the data needed to build the complete bit-plane named BP0 (bit-plane 0). FIG. 22b shows the data output on the BP0 signal from the SuperMux when row 215 is input over time from the source. As the input source inputs successive pixels, the SuperMux must route different input signals to the SuperMux out signal BP0. The data from signal BP0 is buffered in the Corner Turn and then written to DRAM to fill in part of the stored bit-plane 0. Row 215 data for BP0 corresponds to time T45 meaning that at T45 (out of 67 time positions) within a color cycle this bit-plane 0 data will be displayed on the DMD when the data is read from the DRAM.

FIG. 22c shows similar data to FIG. 22b except for a generalized BPxy SuperMux output signal and at T33.

Thus the SuperMux must know the transition points, and shift the data appropriately, so that the resulting bit-planes have the correct mixed-bit data. The SuperMux is dynamic in that it shifts the order of where input bits are routed to the SuperMux output signals at transition points throughout each active line of pixel data coming from the video source. More details on the operation of the SuperMux will be discussed below.

While Global Reset makes operation of this invention easier to understand, it also creates long idle times between each full loading cycle of the DMD. These idle times, where no DMD loading can take place, occur during the "mirror settling time." After the memory cell behind a mirror is loaded, and this data is applied to the mirror with a reset pulse, data cannot be reloaded into the memory cell until the mirror is settled. This settling time is a significant percentage of the bit-slice stepping speed. This idle time will slow down the stepping speed of the bit-slices that makes images more susceptible to the Skew Stepping Artifact. One way around this reduction in bit-slice stepping speed is to further reduce the DMD load time. The solution, however, can be costly in electronics such as in ASIC package pin count, DMD package pin count, and the number and speed of board DRAM ICs needed.

With the preferred embodiment of this invention, Phased Reset can be used for loading the DMD instead of Global Reset. Like with FSC projectors, phased reset offers a more suitable loading and reset solution than Global Reset. Timing for loading the DMD and resetting reset blocks is more complex with Phased Reset but the "mirror setting time" penalty is eliminated which occurs when Global Reset is used with this invention.

Assuming that the mirror settling time is 20 µs, then for Global Reset, a typical reset-to-reset time (same time duration as bit-slice stepping) for an XGA DMD with a load time of 66 µs is given by:

$$DMD \text{ Load time} + \text{mirror settling} + 36 \text{ row } LSB \text{ reload} = 66 \text{ µs} + 21 \text{ µs} + 3 \text{ µs} = 90 \text{ µs}$$

This sets the bit-slice stepping time at 90 µs. It is desirable to have a faster stepping time than this to reduce the Skew Stepping Artifact. Under worst case conditions (max frame rate, no clock dropping, and max DMD optical overfill) it is desirable to achieve a 70 µs peak bit-slice stepping speed. The idle times due to waiting on mirror settling wastes bandwidth for the board RAM and DMD interface. Stepping speed could be improved by improving the DMD load time, but as mentioned, this adds cost to the electronics. Also, in general, the electronics are not fully optimized if the RAM and DMD interface go idle for significant periods of time. The preferred embodiment of this invention introduces a new phased reset method that will eliminate this wasted bandwidth and maximize the achievable bit-slice stepping time.

For example, eliminating the mirror settling time will improve the peak bit-slice stepping time from 90 µs to 90 µs−20=70 µs. As mentioned above, 70 µs is desirable under worst case conditions. So Phased Reset allows this faster stepping time to be achieved without needing a faster DMD load time. And Phased Reset reclaims (100−(70/90)×100)=22% of DMD and RAM bandwidth that was wasted when using Global Reset.

FIGS. 23 and 24 provide examples of phased reset timing. In FIG. 23, the scroll direction is the same as the reset phase. In FIG. 24, the scroll direction is opposite that of the reset phase. In these examples, the LSB transit time is equal to the product of the sum of the number of blocks and the phase direction, the phase offset and the slice time. The slice time is the ratio of the number of color cycles divided by the number of slices per color cycle.

For the examples of FIGS. 23 and 24, there are 16 blocks, 64 sub-blocks and therefore 4 sub-blocks per block. The phase direction is defined as 1 if the reset phase is in the same direction as the scroll and −1 otherwise. In the case of FIG. 23, the phase direction is 1 and in the case of FIG. 24 the phase direction is −1. Using the equations shown in these Figures, it can be seen that the LSB transit time in the example of FIG. 23 is $64^{16}/_{17}$* <slice time> and the LSB transit time in the example of FIG. 24 is $63^{1}/_{17}$* <slice time>.

The preferred embodiment utilizes a concept known as clock dropping for two purposes; namely, for compensating for the AC lamp light transients and for phase locking the sequence to the color wheel. Phase locking and compensation for AC lamp light transients are taught in co-pending application Ser. No. 10/458,045, incorporated herein by reference.

Specific embodiments of implementation of the present invention will now be described. FIG. 25 shows a block diagram that provides an embodiment of this invention for supporting the SCR optical method. The SCR color wheel 114 used in embodiment is as shown in FIG. 2, as an example. The lamp 110 is typically a short arc ($\leq 1.0$ mm) UHP type lamp. The resonator rod 112 (including an input aperture) is used with the SCR color wheel as described in co-pending application Ser. No. 09/705,467.

A wheel position sensor 160 is used to determine the position of the color wheel 114. The output of this sensor 160, signal CCINDEX, goes to a microprocessor (uP) 162, which will implement a control loop to phase and frequency lock the motor 128 (signal CCINDEX) to the VSYNC signal from the video source (not shown). This embodiment assumes 3× operation meaning 3 color cycles occur for every source frame. It is understood that other rates are also possible. For the wheel in FIG. 2, which has segments GWBRGWBR, the wheel will spin at 90 Hz for a 60 Hz input frame rate. Another way to describe the wheel is to say that it has two sets of physical color cycles printed on it. [(2 CC on wheel)×90 Hz/60 Hz=3]. Accordingly, the wheel will spin 1.5 revolutions per frame. This gives 3× sets of color bands per frame.

RGB 24-bit motion video or still graphics are input to a degamma RAM look-up table 164 (upper left-hand corner of FIG. 25). The degamma output is extended to 14 bits per color to allow for the displaying of dark color shades on the DMD. These 42 bits are routed to the Blue-Noise STM circuit 166, which will use dithering to achieve 14 bits per color of effective bit depth resolution on the DMD although the DMD is loaded with only eight "real" bits. Eight real bits means that 256 shades of every color are achieved where the LSB has a weight of 1.0 out of 256 equal sized color intensity levels. This "real" LSB on-time is typically 15 µs out of 3840 µs of on-time available for a typical R, G, or B color band size. (3840 µs/15 µs=256).

Prior to the BN STM block 166, RGBW Hue Correction (HC) 168 and Secondary Color Boost/Spoke Light Recapture (SCB/SLR) 170 functions are used. The RGBW HC block 168 creates an 8-bit W bus that will be used to define gray shades for use by SLR in the subsequent block 170. The RGBW HC block 168 will also subtract data as needed from each R, G, and B 14-bit busses to correct any hue errors that are created when the W bus data is applied to the DMD via the spokes and W segment.

The SCB/SLR block 170 will take the RGB and W bus data and then create 16 spokes bits (4 spoke bits for each of the 4 spokes). The eight W bits that are input to the SLR block 170 are processed by the SLR function and then output as 8 new W bits which are generated so that they work with the spoke bits to create the shades of gray needed on the DMD. The SLR function includes the Spoke Hue Trim (SHT) feature, which will alter the values on the RGB busses by adding or subtracting small values. SHT corrects any small hue and/or intensity errors generated when the SLR function creates the 8-bit W bus and 16 spoke bits.

The BN STM circuit 166 passes through the W bus and Spoke bits unaltered. The 42 bits of RGB are processed where the LSBs are dithered as needed to create additional color shades. Eighteen of the 42 bits output from the BN STM block 166 are STM LSBs. Six STM LSBs are used per R, G, or B as described earlier for 3× operation. Two LSBs are used per color within each color cycle. So over three color cycles (2×3=6 LSBs) are needed per color. The 42 bits of RGB, the 8 bits of W, and the 16 Spoke bits are all input to the Noise-Free Boundary Dispersion block 172.

A non-binary conversion function (e.g., RAM look-up) exists within the Boundary Dispersion block 172 that creates the RGB non-LSBs that will control the RGB non-LSB bit-slices. Twenty-nine non-LSBs are generated for R and G and 28 non-LSBs are generated for B. These non-LSB bits define the maximum number of curved bit-slices that may exist within an R, G, or B color band on the DMD (assuming that each bit-slice is assigned to a unique bit that is input to the SuperMux Data Formatter 174). Boundary Dispersion will dither these non-LSBs to give the same benefits provided by Boundary Dispersion in FSC systems as well as the new benefits described above for mitigating the stepping skew artifact and allowing the use of thermometer scale PWM.

The Boundary Dispersion block 172 has a total of 128 output bits. These bits comprise 104 RGB bits (29 R and G non-LSBs, 28 B non-LSBs, 18 RGB total STM LSBs), 8 W bits and 16 Spoke bits. These 128 bits are input to the SuperMux Data Formatter 174. Not all of these bits will be displayed on the DMD. The bits that will be used depend on the SCR color wheel 114 segment sizes and spoke sizes. Bigger segments have more bit-slices and thus require more color bits. Likewise bigger spokes have more bit-slices and thus more spoke bits. The SuperMux will be configured in firmware that is read from FLASH (e.g., flash memory 163 or other flash memory, not shown) at power-up. This FLASH data will be used to load the SuperMux Configuration Registers 176 and to download the SuperMux Row Configuration SRAM 180 inside the ASIC. This firmware will select which SuperMux input bits are used in a particular system configuration. For example, of the 128 SuperMux Data Formatter input bits available, only 100 might be used in a typical system.

It should be pointed out that with this embodiment, a SuperMux Data Formatter 174 input bit may control more than one bit-slice. This could save bits coming out of the Boundary Dispersion block 172 but it will not reduce the number of bit-planes required. This would also allow even larger segment sizes to be used for R, G, B, or W.

The SuperMux Data Formatter 174 does much more than just select which bits are to be used in a particular projector system. The SuperMux Data Formatter 174 also does the re-mapping of SuperMux input bits into the SuperMux output bit-plane data as described earlier in this specification. Thus the SuperMux is a new method of "formatting" bit-plane data for DMD systems.

The SuperMux Row Configuration SRAM 180 contains data that is read at the start of every active input source line (at HSYNC). This data will tell when a shift occurs in the ordering of signals at the output of the SuperMux Data Formatter 174. This shifting, as described earlier, is needed for properly creating the mix-bit bit-planes. A shift occurs at each pixel position where a bit-slice curved transition point occurs on the DMD. These transition points are derived from a bit-map of the image of all curved bit-slice stepping positions on the DMD. These transition points for all rows must be stored in the SuperMux Row Configuration SRAM. The SuperMux Row Configuration SRAM 180 is loaded at power up, with data from flash memory (e.g., flash memory 163 or other flash memory, not shown), so that data is quickly available to be read at high speed from the Super-Mux Row Configuration SRAM 180 at the start of each active input line from the source.

The output of the SuperMux Row Configuration RAM 180 goes to the SuperMux Shift Controller block 178. This block is shown in more detail in FIG. 26. This block 178 contains a pixel column counter 182 that begins counting at the start of the active data (when signal ACTDATA goes high). The counter 182 will increment for each active pixel so that this block knows which pixel is currently being input to the SuperMux. The SuperMux Shift Controller 178 will generate a 4-bit shift position value that changes at each pixel position in a row that is at a curved bit transition point on the DMD. When this 4-bit value changes then the ordering of the bits at the output of the SuperMux Data Formatter 174 will change. Four bits allow 16 different shift options at the output of the SuperMux.

Figure 26:
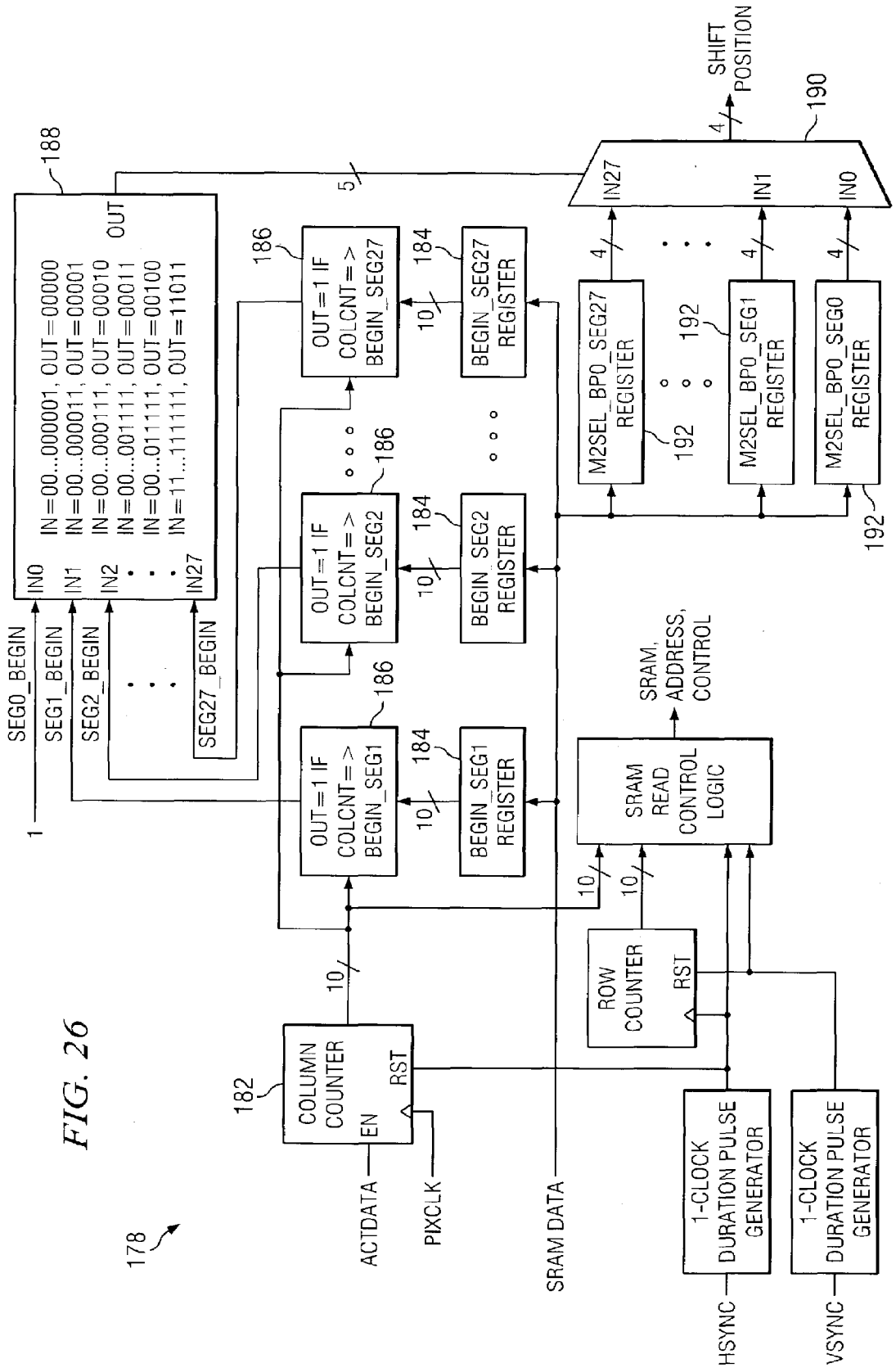
FIG. 26 shows more details of a circuit block of FIG. 25.

The SuperMux Shift Controller 178 shown in FIG. 26 counts pixels in a row so that it can determine when the bit transitions occur and a SuperMux shift is needed. The BEGIN_SEGx registers 184 are loaded at the start of each line with data from the SuperMux Row Configuration SRAM 180 (see FIG. 25). The BEGIN_SEGx register data is used to select the bit transition points on the current row of pixels. These register values are compared to the column counter 182 output by blocks 186. The column counter 182 output increments at each clock for an active input pixel, and causes a SEGx_BEGIN flag to be set at a bit transition point.

Combinational logic 188 looks at these flags and then generates a 5-bit bus that is used as the select input to a multiplexer 190. This multiplexer 190 will output the 4-bit Shift Position to the SuperMux. The inputs to the multiplexer 190 are from registers 192 that are loaded at the start of each active row with data from the SuperMux Row Configuration SRAM 180. The registers 192 contain the shift position value for each segment between curved transition points during the active row. Twenty-eight registers are used to allow up to 28 transition points in a row. In this embodiment, only 16 unique values out of these 28 segments in a line are allowed. And as transitions occur, only a +1 or −1 change to the Shift Position is allowed. These limitations are used to allow a practical circuit implementation to be used in the SuperMux Data Formatter as described below.

The row counter will increment at the beginning of each new source input line. It will be reset at VSYNC. A one-clock pulse circuit is used so that when VSYNC goes high, a reset of the row counter is done in one clock period and then the counter is ready to increment again when ACTDATA goes high at the start of the first active source line. So, even if VSYNC is still high at the start of the first active line, the counter is unaffected by the VSYNC state and it is ready to begin counting. A one-clock duration pulse when ACTDATA goes high assures that the row counter only increments by +1 at the start of each new active source line.

The SRAM read control logic outputs addressing and control signals for reading this SRAM during the blanking time for each input line. The SRAM is read so that, on a line-by-line basis, all registers shown in FIG. 26 are loaded.

These registers must be reloaded for each input line since the SuperMux shifting operations are different for every input line.

Returning to FIG. 25, each active signal at the output of the SuperMux Data Formatter block 174 is used to build up one bit-plane in the bit-plane storage DRAM 194, as described above. For efficient writing of these bit-planes to DRAM 194, a Corner Turn Buffer 196 is used so that words can be formed that have all bits within the same bit-plane.

The SuperMux Data Formatter 174 will typically route some of the 128 input bits to more than one of the SuperMux output bits. In other words, some of the input bits are routed to multiple output bits. This duplication occurs for the outputs that are used as WLBPs since some input bits must be duplicated within the WLBPs as described earlier and shown in FIGS. 19–21. This is because in the WLBPs, the RGB non-LSB data is identical and only the W LSB data changes. This is true since, as described earlier, RGB non-LSBs are identical in each color cycle with this invention.

Figure 27:
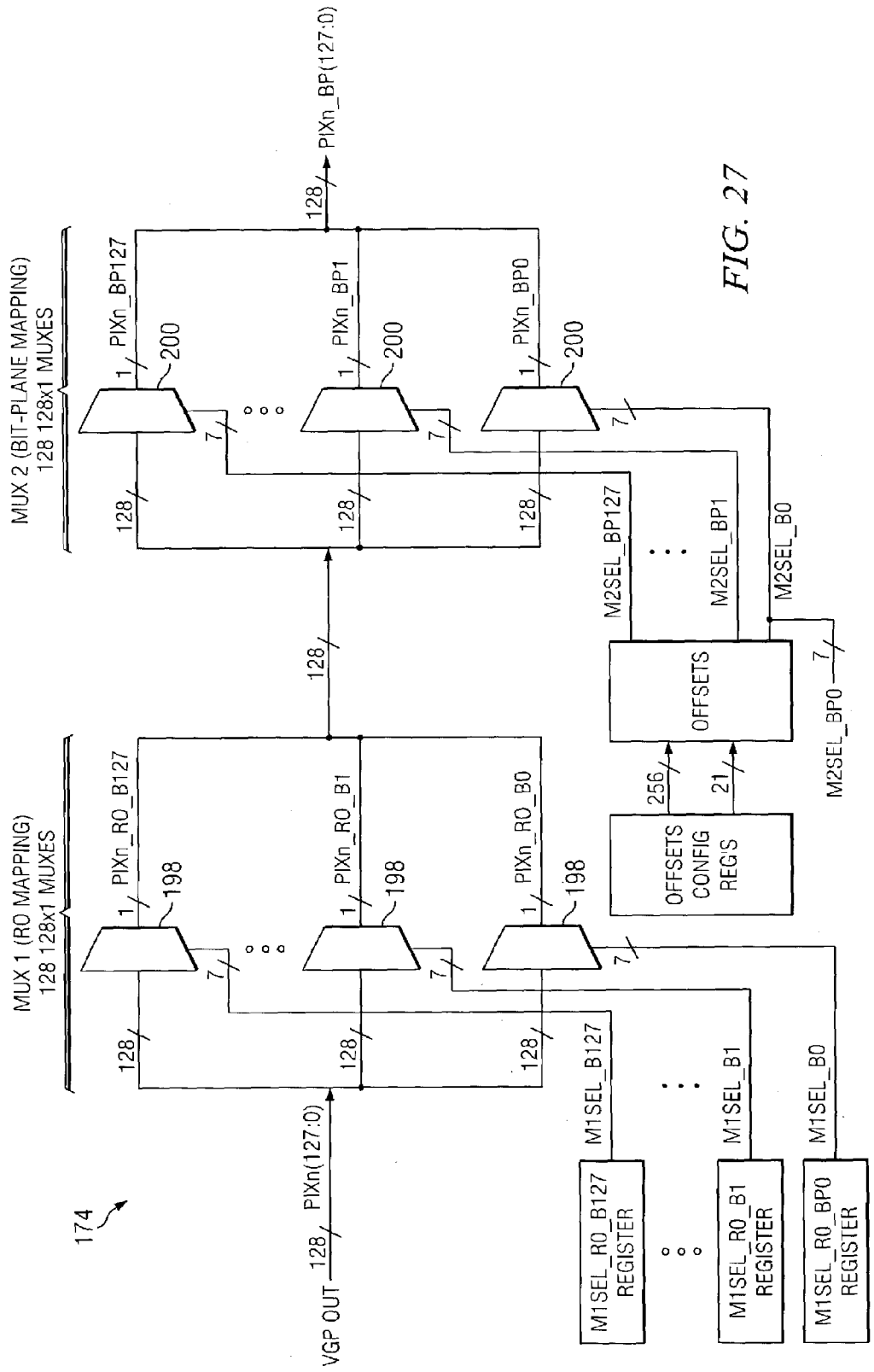
FIG. 27 shows a block diagram of the SuperMux.
Figure 28:
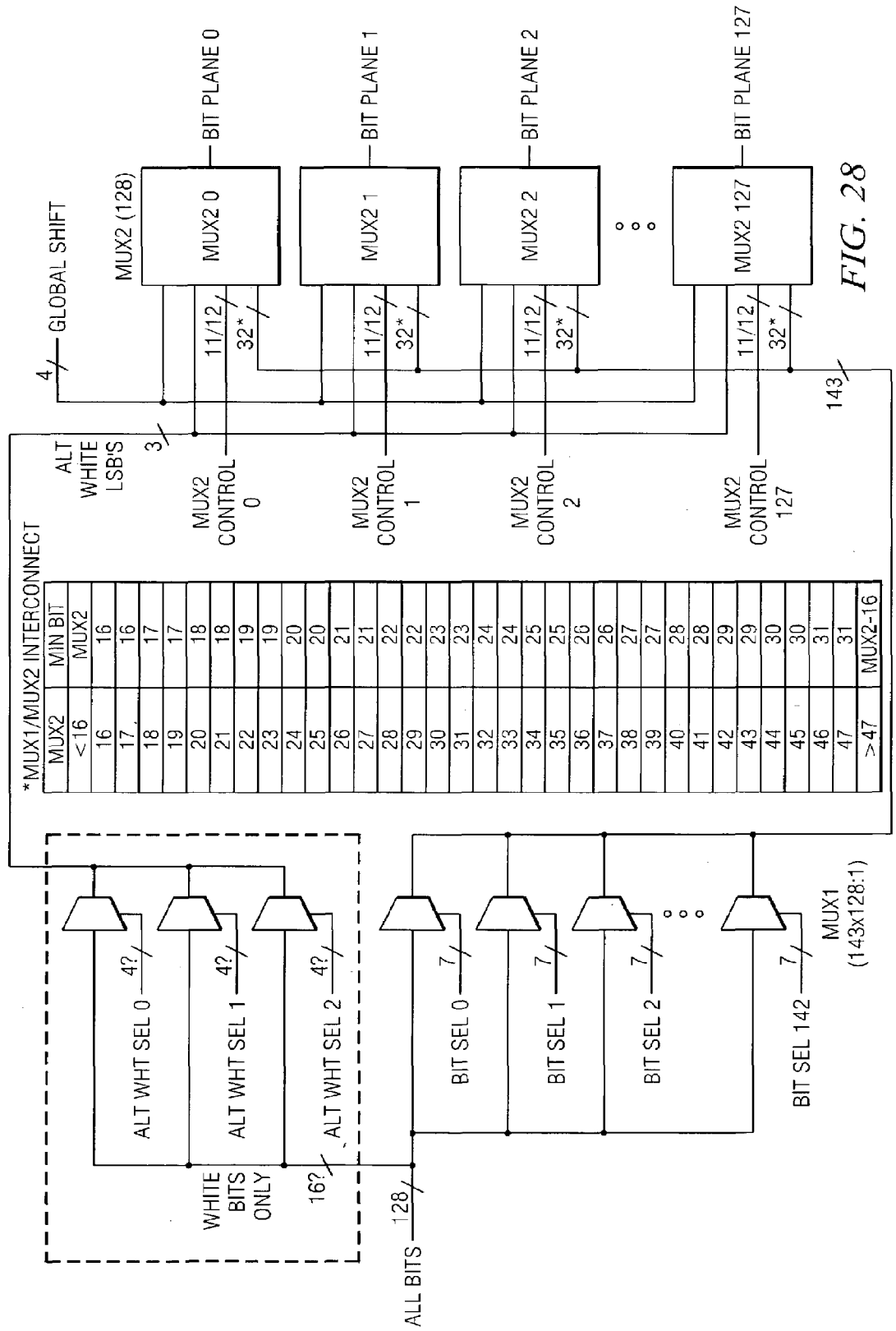
FIG. 28 shows a multiplexer block.
Figure 29:
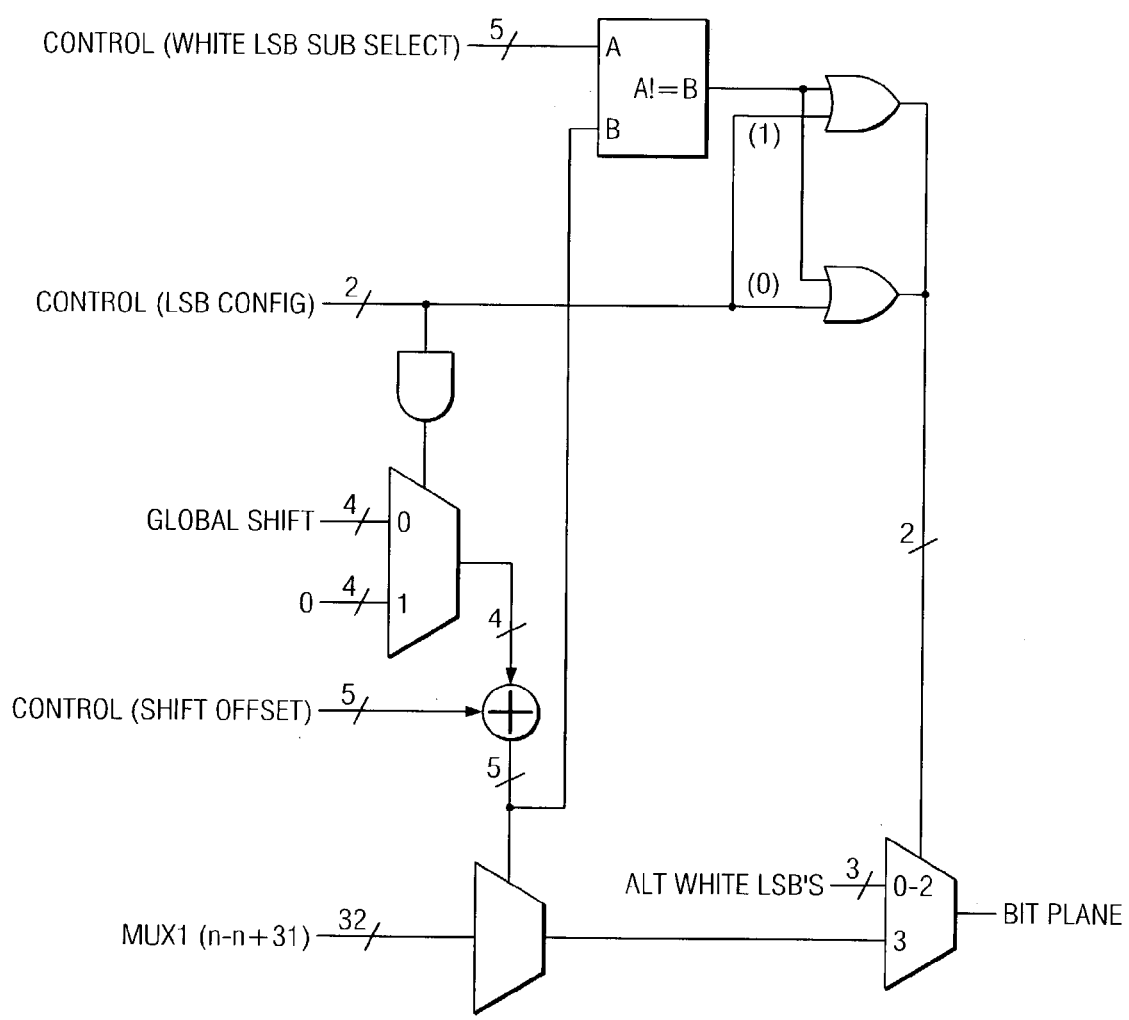
FIG. 29 shows a multiplexer block.

The 4-bit Shift Position goes to logic in the SuperMux Data Formatter. FIG. 27 shows a SuperMux block diagram and FIG. 28 shows a MUX2 block. This logic derives a set of multiplexer select values for each multiplexer in MUX2. This routing corresponds to the routing shown in FIGS. 19 and 20.

Returning to FIG. 25, a control loop is used in the microprocessor 162 to phase lock the SCR color wheel, which has its rotation determined with a sensor that outputs signal CCINDEX (color cycle Index), to VSYNC. The software running on processor 162 can be stored in flash memory 163. Another control loop is used in the processor 162 to phase lock the SEQINDEX (sequence index) to CCINDEX. The processor 162 is able to phase lock the SEQINDEX signal to the CCINDEX signal by adjusting clock dropping which controls the number of clocks per color cycle going to the Phased-Reset Sequencer. The number of clocks dropped increases to slow down the Sequencer if the sequence is running too fast. This is determined by the processor 162, which measures and compares the time between SEQINDEX edges to the time between CCINDEX edges. Also, fewer clocks can be dropped to speed up the sequence if it is running too slowly.

The Clock Dropping circuit 202 also receives the 10-bit data from the ADC 204, which is sampling the white light from the lamp. An analog sensor 160 is used to detect the white light intensity. Clock dropping will adjust to compensate for lamp light transients as described above. The clock dropping will be adjusted real-time to compensate for the light increase or decrease during the AC lamp light transients. A detailed description of the internal Clock Dropping block is provided in co-pending application Ser. No. 10/458, 045, which is incorporated herein by reference.

The Phased-Reset Sequencer 204 generates the commands to read sub-blocks, from within bit-planes, from the board Bit-Plane Storage DRAM 194. The memory 194 may be a 128 Mbit DRAM integrated circuit. The Memory Controller 206 generates the control signals needed for the reading and writing of data from/to the Bit-Plane Storage DRAM 194 as well as the Corner Turn Buffer 196 and DRAM Read Buffer 208. "Unified Bus" architecture is used in this embodiment but a double buffer 2×DRAM scheme could be used also for a different embodiment of this invention. The Memory Controller 206 coordinates the reading and writing of data from/to the DRAM. All reads of bit-planes are done upon the sub-block read commands being issued to the Memory Controller 206 by the Phased-Reset Sequencer 204.

The Phased-Reset Sequencer 204 also issues commands to the XGA (1024×768) DMD 122 for loading it. And the Sequencer 204 issues commands to a DMD Reset Block Waveform Driver 210, which in turn applies reset waveforms to the DMD reset blocks. Sixteen reset lines are sent to the XGA DMD 210, which has 16 reset blocks. Sixteen reset blocks gives 48 (768/16=48) pixels per reset block. Thus for the 12 pixel tall sub-blocks, four (48/12=4) sub-blocks fit into a reset block. For the rectangular LSB bit-slices, which always map exactly into one sub-block, the LSB steps exactly four times in each reset block and then completely steps into the next reset block. Thus, only a single reset block per color must be reset for applying the reloaded LSBs.

The block diagram of FIG. 25 shows several functional blocks. This delineation of functions, however, is merely illustrative and should not be considered in a limiting sense. In the preferred embodiment, the control circuitry of FIG. 25 is implemented in six integrated circuit chips (plus the DMD 122). For this embodiment, a single chip (e.g., an application specific integrated circuit or ASIC) is designed for the following tasks: digamma circuit 164, blue-noise STM circuit 166, RGBW hue correction circuit 168, SCB/SLR circuit 170, noise-free boundary dispersion circuit 172, SuperMux data formatter 174, configuration registers 176, SuperMux shift controller 178, corner turn buffer 196, DRAM read buffer 208, processor 162, clock dropping circuit 202, phased-reset sequencer 204, and memory controller 206.

The SuperMux row configuration RAM 180, the bit-plane storage RAM 194, flash memory 163, analog-to-digital converter 204, and DMD reset block waveform driver 210 are formed in separate integrated circuits. This design choice is made because of the commodity nature of memory. It is understood, however, that any of these functions could be included in the ASIC. Alternatively, the ASIC functions could be separated out into two or more integrated circuits.

Although this invention is optimally suited for scrolling curved color bands, it also works well with scrolling rectangular color bands. With straight line boundaries between color bands, however, the preferred embodiment of this invention does not reduce spoke sizes due to curvature. But this invention still achieves all of the other benefits described herein.

It is also noted that the color band boundaries do not have to use Spiral of Archimedes curves. Any shape is allowed provided that the RGB pure color zones exist.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of generating data for a color display, the method comprising:

receiving a plurality of digital data signals, the digital data signals representing bits of data to be displayed during a frame, the bits of data comprising different color bits;

arranging the bits of data into a plurality of constant-weight segments corresponding to scrolling curved color segments of a color filter in an optical display device, so that the data displayed during each of a plurality of equal length time periods will comprise a plurality of color bands; and providing the segments to a digital display system;

wherein the scrolling of the curved color segments causes the curved color segments to vary in curvature within a frame period;

and wherein the arranging step comprises mapping the varying curvature into the plurality of constant-weight segments.

2. The method of claim 1 wherein the scrolling of the curved color segments causes the curved color segments to vary in speed within a frame period;

and wherein the arranging step further comprises adjusting the height and area of the segments over the frame period to compensate for the varying speed of the curved color segments.

3. The method of claim 1 and further comprising determining a curved block of white or a secondary color least significant bits that can be displayed during one of the equal length time periods.

4. The method of claim 1 wherein the digital data signals represent bits of red, green and blue data.

5. The method of claim 4 wherein the digital data signals further represent bits of white or secondary color data.

6. The method of claim 1 and further comprising generating the plurality of digital data signals from an analog video signal.

7. The method of claim 1 and further comprising displaying the data bits at the digital display system.

8. The method of claim 1 wherein the digital display system includes a DMD spatial light modulator.

9. The method of claim 1 wherein the data bits comprise a plurality of color cycles for a single frame of data.

10. The method of claim 9 wherein each frame of data includes at least three color cycles.

11. A method of generating data for a color display, the method comprising:

receiving a plurality of digital data signals, the digital data signals representing bits of data to be displayed during a frame, the bits of data comprising different color bits;

arranging the bits of data into a plurality of constant-weight segments corresponding to curved segments of a color filter in an optical display device, so that the data displayed during each of a plurality of equal length time periods will comprise a plurality of color bands;

determining one or more rectangular blocks of data bits of a color corresponding to one of the curved color segments, the rectangular blocks comprising data to be displayed during contiguous time periods proportional to weights of each block, and providing the segments to a digital display system;

wherein the total of the contiguous time periods is equal to one of the equal length time periods.

12. The method of claim 11 wherein one of the equal length time periods is greater than about five times as long as one of the contiguous time periods.

* * * * *